(12) United States Patent
Arora et al.

(10) Patent No.: US 8,099,572 B1
(45) Date of Patent: Jan. 17, 2012

(54) EFFICIENT BACKUP AND RESTORE OF STORAGE OBJECTS IN A VERSION SET

(75) Inventors: Gurjeet S. Arora, Piscataway, NJ (US); Ivan Bassov, Westborough, MA (US); Sorin Faibish, Newton, MA (US); Ugur Sezer, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 631 days.

(21) Appl. No.: 12/242,694

(22) Filed: Sep. 30, 2008

(51) Int. Cl.
- G06F 13/00 (2006.01)
- G06F 13/28 (2006.01)
- G06F 7/00 (2006.01)
- G06F 17/00 (2006.01)

(52) U.S. Cl. ............... 711/162; 711/E12.013; 707/640; 707/674

(58) Field of Classification Search .............. 711/162, 711/E12.013; 707/640, 674
See application file for complete search history.

(56) References Cited

U.S. PATENT DOCUMENTS

| | | |
|---|---|---|
| 4,686,620 A | 8/1987 | Ng |
| 4,755,928 A | 7/1988 | Johnson et al. |
| 4,947,367 A | 8/1990 | Chang et al. |
| 5,060,185 A | 10/1991 | Naito et al. |
| 5,206,939 A | 4/1993 | Yanai et al. |
| 5,434,994 A | 7/1995 | Shaheen et al. |
| 5,535,381 A | 7/1996 | Kopper |
| 5,596,706 A | 1/1997 | Shimazaki et al. |
| 5,673,381 A | 9/1997 | Huai et al. |
| 5,673,382 A | 9/1997 | Cannon et al. |
| 5,742,792 A | 4/1998 | Yanai et al. |
| 5,819,292 A | 10/1998 | Hitz et al. |
| 5,829,046 A | 10/1998 | Tzelnic et al. |
| 5,893,140 A | 4/1999 | Vahalia et al. |
| 5,915,264 A | 6/1999 | White et al. |
| 6,076,148 A | 6/2000 | Kedem |
| 6,314,503 B1 | 11/2001 | D'Errico et al. |
| 6,353,878 B1 | 3/2002 | Dunham |
| 6,366,987 B1 | 4/2002 | Tzelnic et al. |
| 6,549,992 B1 | 4/2003 | Armangau et al. |
| 6,792,518 B2 | 9/2004 | Armangau et al. |
| 6,957,362 B2 | 10/2005 | Armangau |
| 7,010,553 B2 | 3/2006 | Chen et al. |
| 7,035,881 B2 | 4/2006 | Tummala et al. |
| 7,107,385 B2 | 9/2006 | Rajan et al. |

(Continued)

OTHER PUBLICATIONS

Vahalia, Uresh, Unix Internals: The New Frontiers, 1996, p. 261-289 and 338-371, Prentice-Hall, Inc., Upper Saddle River, NJ.

(Continued)

*Primary Examiner* — Edward Dudek, Jr.

(74) *Attorney, Agent, or Firm* — Richard Auchterlonie; Novak Druce & Quigg, LLP

(57) ABSTRACT

The version set backup and restore facility responds to a version set backup request by backing up multiple snapshot copies of a storage object concurrently from a storage array to backup storage media. The version set backup and restore facility responds to a version set restore request by restoring a plurality of snapshot copies of the storage object concurrently from the backup storage media to the storage array. The on-tape backup image of the version set includes variable-length extents of data for each of the multiple snapshot copies of the storage object. The variable-length extents of data for each of the snapshot copies of the storage object are grouped together and ordered in the on-tape backup image by increasing or decreasing logical block address.

18 Claims, 13 Drawing Sheets

U.S. PATENT DOCUMENTS

| | | |
|---|---|---|
| 7,146,476 B2 | 12/2006 | Sandorfi et al. |
| 7,430,647 B2 | 9/2008 | Sandorfi et al. |
| 2003/0217119 A1 | 11/2003 | Raman et al. |
| 2004/0030727 A1 | 2/2004 | Armangau et al. |
| 2004/0139128 A1 | 7/2004 | Becker et al. |
| 2005/0044162 A1 | 2/2005 | Liang et al. |
| 2005/0065986 A1 | 3/2005 | Bixby et al. |
| 2006/0242182 A1 | 10/2006 | Palaniappan et al. |
| 2007/0033236 A1 | 2/2007 | Kaneko et al. |
| 2010/0030959 A1* | 2/2010 | Satoyama et al. ............ 711/112 |

OTHER PUBLICATIONS

Stager et al., "Network Data Management Protocol (NDMP)," Network Working Group Internet Draft, filename "draft-stager-iquard-netapp-backup-05.txt," Oct. 12, 1999, 73 pages, The Internet Society, Reston, VA.

"Network Data Management Protocol (NDMP) White Paper, and Protocol Specification Summary, Document Version: 1.7.2S," ndmp.org, printed Oct. 11, 1999, 15 pages, NDMP organization.

"EMC Symmetrix DMX Architecture," Product Description Guide, Mar. 2004, 76 pages, EMC Corporation, Hopkinton, MA.

"Enginuity: The Symmetrix Storage Operating Environment," EMC White Paper, Jul. 2005, 22 pages, EMC Corporation, Hopkinton, MA.

EMC Celerra HighRoad, Jan. 2002, 13 pages, EMC Corporation, Hopkinton, MA.

Fridella et al., "Elements of a Scalable Network File System Protocol," NEPS Workshop at the University of Michigan, Ann Arbor, MI, Dec. 4, 2003, position paper (5 pages) and presentation ("Building a Scalable NFS," 13 pages), EMC Corporation, Hopkinton, MA.

"EMC TimeFinder Product Description Guide", Dec. 1998, 34 pages, EMC Corporation, Hopkinton, MA.

HP JFS 3.3 and HP OnLine JFS 3.3 VERITAS File System 3.3 System Administrator's Guide for HP-UX 11.00 and HP-UX 11i, Nov. 2000, 166 pages, Hewlett-Packard Co., Palo Alto, CA.

"Concurrent Versions System," Wikipedia, printed Sep. 4, 2008, 4 pages, Wikimedia Foundation Inc., San Francisco, CA.

"Magic Number (programming)," Wikipedia, Aug. 27, 2008, 6 pages, Wikimedia Foundation Inc., San Francisco, CA.

"Magic(4)," HP-UX Reference (vol. 8 of 9): Section 4: File Formats, printed Sep. 4, 2008, 2 pages, Hewlett-Packard Co., Palo Alto, CA.

McVoy et al., "Extent-like Performance from a UNIX File System," USENIX—Winter '91, Jan. 21-25, 1991, 12 pages, Dallas, TX, Sun Microsystems, Santa Clara, CA.

"Sun StorEdge 990 Flash Copy 2.0 Software for Sun StorEdge 9970 and 9980 Systems," Storage, Article #14148, vol. 84, Issue 4, Feb. 21, 2005, 2 pages, System News, Inc., Coral Springs, FL.

"Extent (file systems)," Wikipedia, May 29, 2007, 2 pages, Wikimedia Foundation Inc., St. Petersburg, FL.

Darcy et al., Webster's New World Dictionary of Computer Terms, 1983, p. 101, Simon & Schuster, Inc., New York, NY.

Kaplan, Steven M., Wiley Electrical and Electronics Engineering Dictionary, 2004, p. 270, John Wiley & Sons, Inc., Hoboken, NJ.

* cited by examiner

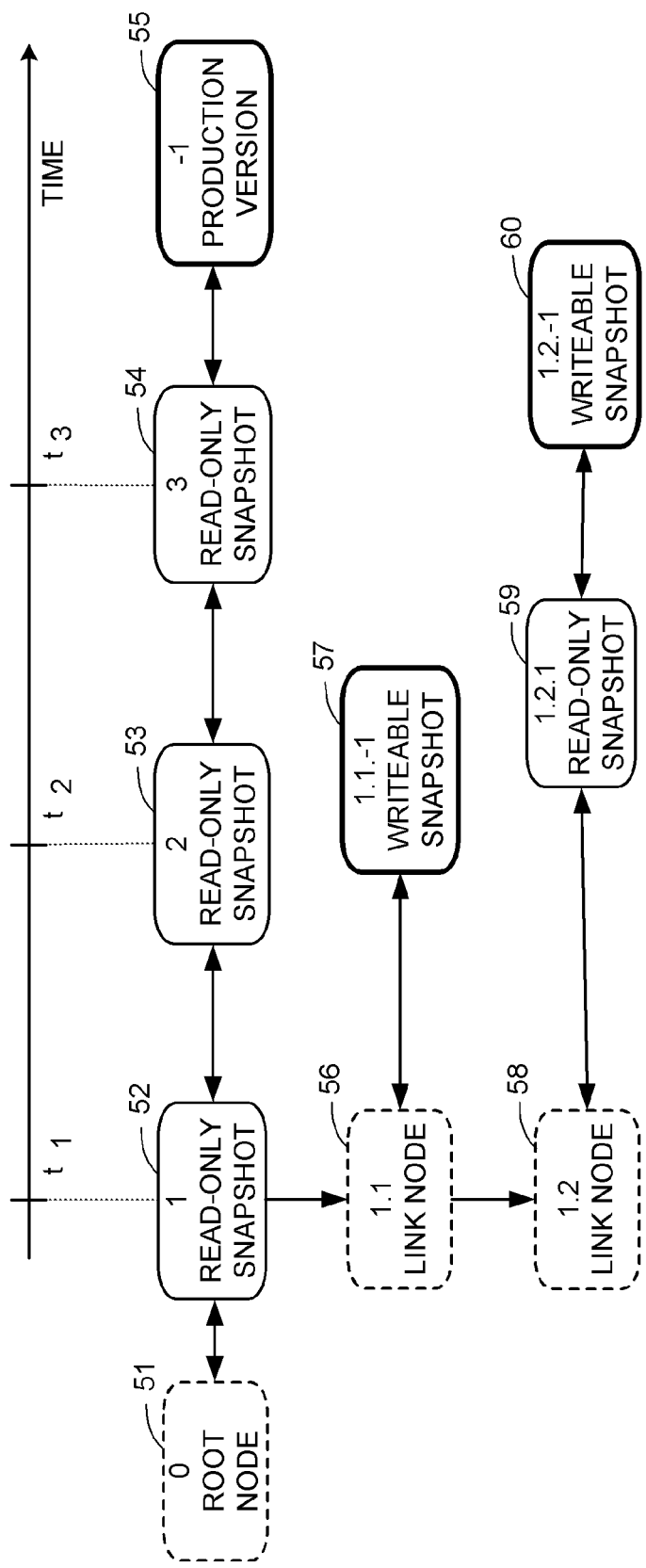

EFFICIENT BACKUP AND RESTORE OF STORAGE OBJECTS IN A VERSION SET

FIELD OF THE INVENTION

The present invention relates to a data storage system having a backup function for storing snapshot copies in mass storage and a restore function for restoring selected snapshot copies from the mass storage.

BACKGROUND OF THE INVENTION

Data backup has been used for decades to protect users from loss of data due to disk storage failure. Recently, loss of data in a network server due to disk storage failure has become infrequent due to techniques such as redundant arrays of inexpensive disk (RAID) and remote data mirroring. Unfortunately, data backup is still needed for recovery from data corruption due to software bugs, user error, malicious software, and unauthorized access to storage.

Data corruption often is detected a significant amount of time after it occurs. Therefore, if a data object is modified by user read-write write access over an extended period of time, it is desired to make a series of point-in-time copies of this data object over the extended period of time. The data object that is modified by the user read-write access is referred to as a "production" data object, and the point-in-time copies are referred to as "snapshot" copies. If data corruption is detected in the production data object, then the snapshot copies are inspected to find the most recent snapshot copy that has not been corrupted. If such a most recent snapshot copy is found, then the production data object is restored with data read from this most recent snapshot copy.

Snapshot copies have been created and maintained at various levels in a data processing system. For example, in the open source software Concurrent Versions System (CVS), snapshot copies have been created and maintained at the application level, on top of the file system level provided by a file server. In the CVS, the storage server stores a current version of a project and its history, and clients connect to the server in order to "check out" a complete copy of the project, work on this copy, and then later "check in" their changes. To maintain consistency, the CVS only accepts changes made to the most recent version of a file. If the check-in operation succeeds, then the version numbers of all files involved are automatically incremented, and the CVS server writes a user-supplied description line, the data and the author's name to its log files. Clients can also compare versions, request a compete history of changes, or check out a historical snapshot of the project as of a given date or revision number. Clients can also use an "update" command in order to bring their local copies up-to-date with the newest version on the server. CVS can also maintain different "branches" of a project, and uses delta compression for efficient storage of different versions of the same file.

Snapshot copies have been created and maintained at the logical block or track level, below the file system level provided by a file server, in a fashion that is concurrent with and transparent to client access. For example, as described in Kedem U.S. Pat. No. 6,076,148 issued Jun. 13, 2000, a backup bit map indicates the backup status of each track during a backup operation. The backup bitmap is used to generate one snapshot. A snapshot table can be used to generate a number of snapshots on an overlapping basis. Each snapshot table entry is associated with a corresponding-indexed track, and includes a plurality of snapshot flags. The information from each track that is transferred to the backup system is accompanied by a copy of the snapshot entry associated therewith so that the information associated with each snapshot copy can be compactly aggregated into one or more backup cartridges, rather than being randomly distributed thereover, so that information from only a few cartridges need be retrieved if a restoration is required.

The creation of snapshot copies at the logical block level can also be done in such a way as to avoid the backup of logical blocks that are not actually used. See, for example, Armangau et al. U.S. Pat. No. 6,6792,518 B2 issued Sep. 14, 2004, and Tummala et al. U.S. Pat. No. 7,035,881 B2 issued Apr. 25, 2006.

The creation of snapshot copies can also be done at the file system level, so that file system indirect blocks and data blocks are shared among versions of a file. See, for example, Bixby et al., U.S. Patent Application Publication 2005/0065986 A1, published Mar. 24, 2005.

The decreasing cost of storage and processing resources is creating a problem of managing backup copies. It is becoming more costly to manage the backup copies than it is to create and store them. For example, it is convenient to backup everything that might be useful, and to defer the problem of finding the relevant information upon the unlikely but possible occurrence of data corruption. See, for example, Tzelnic et al. U.S. Pat. No. 6,366,987 B1 issued Apr. 2, 2003, in which a data storage system has an application interface that responds to a backup request by creating a catalog of information about the content of a physical storage unit that would be needed for restoring logical data structures from the backup version of the physical storage unit. Later, if and when the backup agent requests the restoration of a logical data structure, the application interface routine looks up the logical data structure in the catalog, issues a physical restore request to the data storage system to retrieve a backup version of the physical storage unit from backup data storage and load it into spare data storage, extracts the logical data structure from the physical storage unit in the spare data storage by performing a logical-to-physical translation, and restores the logical data structure into the current version of data storage.

SUMMARY OF THE INVENTION

In view of the increasing cost of managing backup copies, it is desired to provide a backup and restore facility and format for more efficient backup and more reliable restoration of a version set of related snapshot copies. It is desired to provide such a backup and restore facility and format that is independent of the facility or mechanism that creates the snapshot copies in the version set. It is desired to provide such a backup and restore facility that abstracts out certain details of the logical data structures in the version set so that the backup and restore facility and format can be used for backup of different kinds of storage objects and is extensible to new storage objects.

In accordance with one aspect, the invention provides a computer-implemented method of operating at least one data processor in a data processing system. The method includes the at least one data processor receiving a version set backup request for backup of multiple snapshot copies of a storage object. The multiple snapshot copies were created at respective spaced points in time. The at least one data processor responds to the version set backup request by backing up the multiple snapshot copies of the storage object concurrently from a storage array to backup storage media. The method further includes the at least one data processor then receiving a version set restore request for restoration of a plurality of snapshot copies of the storage object, and said at least one data processor responding to the version set restore request by restoring the plurality of snapshot copies of the storage object concurrently from the backup storage media to the storage array.

In accordance with another aspect, the invention provides a data processing system including client computers, a storage array for storing data at logical block addresses of storage in the storage array, a file server, and a tape library unit. The file server is coupled to the client computers in a data network and coupled to the storage array for providing the client computers with access to storage objects stored in the storage of the storage array. The tape library unit is coupled to the file server for backup of data written to tape in the tape library unit, and for restoration of data read from the tape in the tape library unit. The file server includes at least one data processor programmed with a snapshot copy facility for producing snapshot copies of the storage objects stored in the storage of the storage array. The at least one data processor is further programmed with a version set backup facility. The version set backup facility is programmed for receiving a version set backup request from one of the client computers for backup of multiple snapshot copies of a specified storage object, and for responding to the version set backup request by backing up the multiple snapshot copies of the specified storage object concurrently from the storage of the storage array to the tape in the tape library unit. The version set backup facility is further programmed for receiving a version set restore request from the one of said client computers for restoration of a plurality of snapshot copies of the specified storage object, and for responding to the version set restore request by restoring the plurality of snapshot copies of the specified storage object concurrently from the tape in the tape library unit to the storage in the storage array.

In accordance with yet another aspect, the invention provides a data storage tape mountable to a tape drive for writing data to the tape and for reading data from the tape. The tape contains a series of data records comprising an image of a version set. The version set includes a series of snapshot copies of a storage object. The snapshot copies of the storage object were taken at respective spaced points in time. The image of the version set includes variable-length extents of data for each of the snapshot copies of the storage object. The variable-length extents of data for each of the snapshot copies of the storage object are grouped together and ordered in the image of the version set by increasing or decreasing logical block address.

BRIEF DESCRIPTION OF THE DRAWINGS

Additional features and advantages of the invention will be described below with reference to the drawings, in which:

FIG. 3 is a block diagram of a directory data structure for management of a version set for a storage object;

Figure 1:
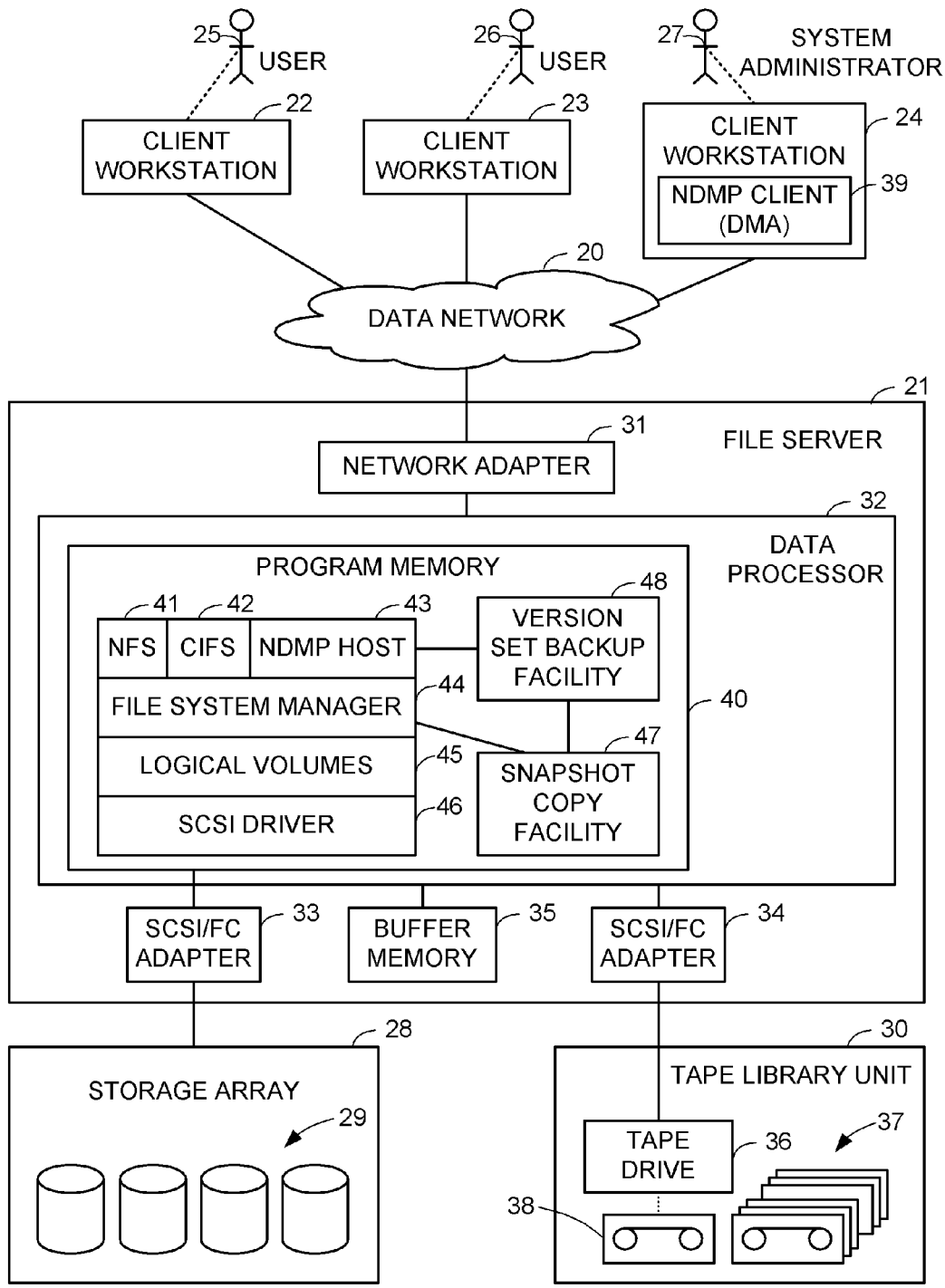
FIG. 1 is block diagram of a data processing system using the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system including a data network 20 linking a file server 21 to client workstations 22, 23, 24 operated by human users 25, 26, 27. The data network 20, for example, is an Ethernet or Internet Protocol (IP) data network. The user 27 is a system administrator responsible for configuration and maintenance of the data processing system.

The file server 21 provides the client workstations 22, 23, 24 with access to data stored in a storage array 28 or a tape library unit 30. The file server 21 includes a network adapter 31 linking the file server to the data network 20, and a data processor 32 coupled to the network adapter 31 and programmed for responding to client requests for access to data stored in the storage array 28 or in the tape library unit 30.

The storage array 28 includes an array of disk drives 29. The file server has a SCSI or Fibre Channel (FC) adapter 33 linking the data processor 32 to the storage array 28 so that the data processor may read data from or write data to specified disk sectors or data blocks using the Small Computer System Interface (SCSI) protocol or the Fibre Channel (FC) protocol.

The tape library unit 30 includes a tape drive 36 and an array of tape cassettes 37. The file server has a random access buffer memory 35 and a SCSI or Fibre Channel adapter 34 linking the data processor 32 to the tape drive 36 so that the data processor may command the tape drive to mount a specified tape cassette 38 upon the tape drive 36 and write data from the buffer memory 35 to the mounted tape cassette 38 or read data from the mounted tape cassette 38 to the buffer memory 35 using the SCSI or Fibre Channel protocol.

The data processor 32 is programmed with a number of program layers in a program memory 40. The program layers include a Network File System (NFS) module 41, a Common Internet File System (CIFS) module 42, and a Network Data Management Protocol (NDMP) host module 43.

The NFS module 41 recognizes file access commands received by the network adapter 31 from the client workstations 22, 23, 24 in accordance with the NFS protocol. The CIFS module 42 recognizes file access commands received by the network adapter 31 from the client workstations 22, 23, 24 in accordance with the CIFS protocol. For example, network clients such as UNIX (Trademark) workstations may use the Network File System (NFS) protocol to access files in the data storage 29 of the storage array 28, and network clients such as Microsoft Windows (Trademark) workstations may use the Common Internet File System (CIFS) protocol to access files in the data storage 29 of the storage array 28.

The NDMP host module 43 recognizes network data management commands from a data management application (DMA) 20 in the system administrator's workstation 24 in accordance with the NDMP protocol. These data management commands include commands for the backup of specified logical volumes or specified files from storage in the storage array 28 to one or more of the tape cassettes 37 in the tape library unit 30, and commands for the restoration of specified logical volumes or specified files from the tape library unit 30.

The data processor 32 is programmed with a file system manager 44 for managing a hierarchical file system in the data storage 29 of the storage array 28. A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. The file system manager 44 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The data processor 32 is also programmed with a volume layer 45 for organizing the data storage 29 into logical volumes of data blocks, and an SCSI driver 47 for linking the volume layer 45 to the data storage 29.

The data processor 32 is further programmed with a snapshot copy facility 47 for making snapshot copies of file systems or files managed by the file system manager 44, and for making snapshot copies of logical volumes managed by the logical volume layer 45. For example, the snapshot copy facility 47 is programmed as described in Armangau et al. U.S. Pat. No. 6,6792,518 B2 issued Sep. 14, 2004, incorporated herein by reference, and Tummala et al. U.S. Pat. No. 7,035,881 B2 issued Apr. 25, 2006, incorporated herein by reference, or Bixby et al., U.S. Patent Application Publication 2005/0065986 A1, published Mar. 24, 2005, incorporated herein by reference.

The NDMP host 43, for example, backs up a specified logical volume, a specified SCSI logical unit of network-attached storage (iSCSI LUN), a specified file system, or a specified file, by invoking the snapshot copy facility 47 to make a snapshot copy of the specified logical volume, iSCSI LUN, file system, or file, and then reading data from the snapshot copy and writing the data to the buffer memory 35, and then invoking the tape library unit 30 to write the data from the buffer memory 35 to the tape cassette 38 mounted to the tape drive 36. In this fashion, the network clients 22, 23, 24 may have concurrent read-write access to the production version of the specified logical volume, iSCSI LUN, file system, or file while data from the snapshot copy is being written to the tape cassette 38 mounted to the tape drive 36.

The decreasing cost of storage and processing resources is creating a problem of managing backup copies. It is becoming more costly to manage the backup copies than it is to create and store them. For example, the snapshot copy facility 47 permits everything that might be useful to be backed up without disruption of read-write access by the client workstations. This creates a problem of finding relevant information upon the unlikely but possible occurrence of data corruption. Addressing this problem requires consideration of what information is relevant, and consideration of the possibility that relevant information might be hidden by data corruption. In particular, it has been found that metadata, such as storage object attributes and the mapping of the storage object data to logical block addresses of the storage, is often very useful for recovery from data corruption. Therefore it is desirable to recover files from a physical backup of the logical volume containing a file system rather than from a logical backup of the individual files. However, a physical backup of the logical volume containing the file system may include file system blocks that are not allocated. In addition, the data and metadata for a particular file is often disbursed throughout the logical volume. Yet removal of redundant information and concentration of relevant information tends to make complete recovery from data corruption more difficult.

To solve this problem, multiple versions of a storage object are backed up concurrently, stored together on a backup storage device, and restored concurrently. Multiple versions of a storage object tend to share attributes and data blocks. Shared attributes provide redundancy of relatively important information, and this redundancy provides some protection from data loss due to corruption. Shared data blocks enable differential backups to substantially reduce the amount of backup storage needed for storing the data. Multiple versions of a storage object should be used collectively for identifying the extent of data corruption, so that the most recent version that has not been affected by the data corruption can be determined with a reasonable degree of certainty, and recovery of useful data from a more recent but corrupted version can be attempted. Backup storage media such as tape is accessed sequentially, so that information used collectively for recovery should be co-located on the storage media.

In FIG. 1, the data processor 32 is programmed with a version set backup facility 48 for responding to a backup request for backing up multiple versions of a storage object concurrently by backing up the multiple versions of the storage object collectively as a version set stored on the backup storage device 38, and for responding to a restore request for restoring the multiple versions of the storage object concurrently by reading the version set from the backup storage device 38 and making the multiple versions accessible to the clients 22, 23, 24 of the file server 21.

Figures 2, 9:
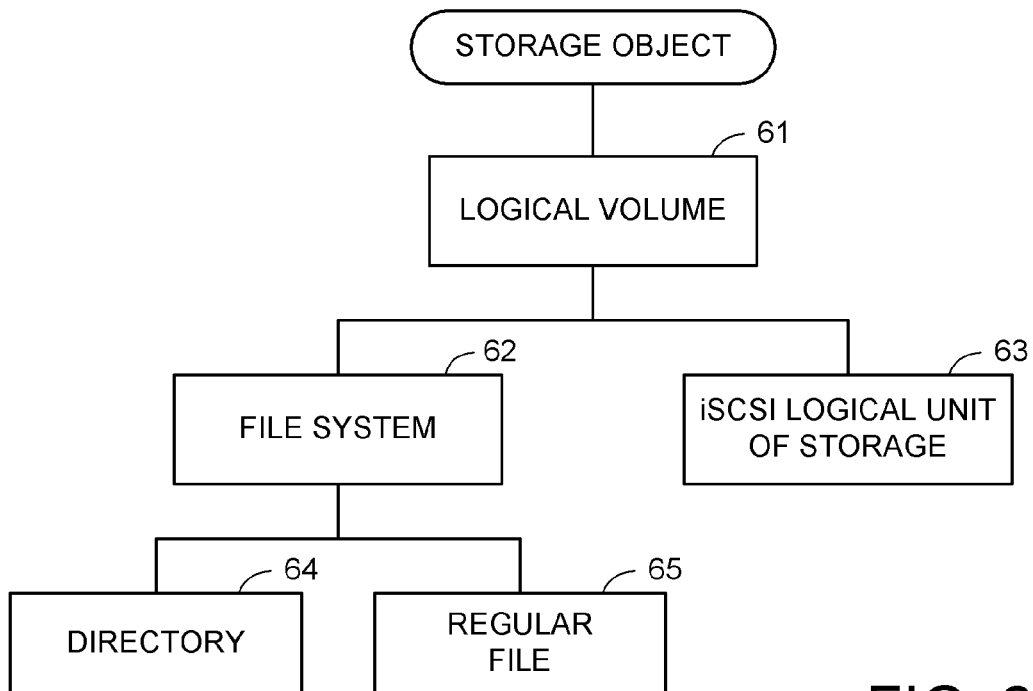
FIG. 2 is a class diagram of storage objects in data storage of the data processing system of FIG. 1.
FIG. 9 is a block diagram of an extent map introduced in FIG. 8.

FIG. 2 shows various storage objects in the disk storage (29 in FIG. 1) of the storage array (28 in FIG. 1). A storage object is any logical grouping of data. For example, the various kinds of storage objects include a logical volume 61, a file system 62, an iSCSI logical unit of storage 63, a directory 64, and a regular file 65. A regular file is a file that is not a directory or link in a file system.

One kind of storage object may contain another kind of storage object. For example, the logical volume 61 may contain the file system 62 or the iSCSI logical unit of storage 63. The file system 63 may contain the directory 64 and the regular file 65.

FIG. 3 shows a directory data structure for management of a version set of a storage object. In a typical case, the storage object is a logical volume, an iSCSI logical unit of storage, a file system, or a regular file. The directory data structure is a tree of nodes 51 to 60. The tree includes a root node 51 for a trunk of nodes 52, 53, 54, 55, and a first branch of nodes 56, 57 off the trunk and a second branch of nodes 58, 59, 60 off the trunk. The nodes 51, 56, 58 depicted in dashed lines are placeholder or linking nodes that are not directory entries for particular versions in the version set but instead root or link together the nodes in the directory data structure. These linking nodes are used in the in-memory version set directory data structure but they are not used for the on-disk version set directory structure. The nodes 55, 57, 60 depicted in heavy lines are directory entries for respective read-write versions of the storage object. The node 55 at the top of the trunk is the directory entry for the production version of the storage object. The nodes 57, 60 at the top of the branches are directory entries for respective writable snapshot copies of the production version. The nodes 52, 53, 54 are respective directory entries of read-only snapshot copies of the production version. The node 59 is a directory entry for a read-only snapshot copy of a writable snapshot copy of the production version.

The version set of FIG. 3 can be created by operation of the snapshot copy facility (47 in FIG. 1) upon a production version. When the snapshot copy facility creates a first snapshot copy of the production version, the directory structure of nodes 51, 52, and 55 is created by allocating the nodes 51, 52, 53 and linking these nodes together. Then the snapshot copy facility creates a second snapshot copy 53 of the production version 55. Then the snapshot copy facility creates a third snapshot copy 54 of the production version 55. Thus, the snapshot copies 55, 53, 54 form a series of three snapshot copies of the storage object of the production version 55 taken at respective spaced points in time $t_1$, $t_2$, and $t_3$.

Some time after the first snapshot copy 52 was created, the writable snapshot copy 57 was taken of the first snapshot copy 52. The writable snapshot copy 57 shares all the data blocks of the first snapshot copy 52 except for blocks that were written to the writable snapshot copy 57 or deallocated from the writable snapshot copy 57 since the writeable snapshot copy 57 was created. Some time after the first writable snapshot copy 57 was taken of the first snapshot copy 52, a second writable snapshot copy 60 was taken of the first snapshot copy 52. Then a read-only snapshot copy 59 was taken of the second writable snapshot copy.

In a preferred implementation, a version set contains versions of either a logical volume or a regular file. The logical volume or file may be a special type of logical volume or regular file for containing another kind of storage object such as an iSCSI logical unit of storage, or a hierarchical file system of directories and regular files.

A particular version set in the file server is uniquely identified by a version set ID. The version set ID, for example, is implemented as a directory pathname, and a directory type indicating that the directory contains a version set. In a specific implementation, a the file server 21 recognizes a command for creating a version set of a storage object having a specified pathname by creating a version set directory having the specified pathname and creating an entry in the version set directory for the storage object so that the storage object becomes the production version for the version set. Whenever a snapshot copy of the production version is created, a respective entry is created in the directory for the snapshot copy. Whenever an entry is created in the directory, a unique number or name for the entry is automatically assigned to the entry in accordance with a predetermined numbering or naming convention that indicates the position of the entry in the version set tree.

In accordance with a preferred numbering convention, a version number for an entry in the version set directory contains an odd number of dot-delimited fields. The relationship of the version number to the entry will never change. Each entry may also have a name and other attributes that are persistent. The version number of the production version is −1. The version number of any writable version ends with −1, and otherwise the version is a read-only snapshot copy. The version number of the root node of the version set directory is 0.

After creation of the production version, whenever a new writable version is created, a branch node is created off a read-only snapshot copy, and a version number for the branch node (i.e., a branch_id) is created by appending branch number to the number of the read-only snapshot copy. The first snapshot copy of the production version has a version number of 1, and the first snapshot copy of any writable version ends in 1. After a first snapshot copy of a writable version, a new snapshot copy of the writable version is set to the version number of the previous snapshot copy of the writable version plus 1. For example, if the version number of the previous snapshot copy of the writable version number is x.y.z, then the version number of the next snapshot copy of the writable version will be x.y.(z+1). When a new branch (or writable snapshot) is created, the version number is derived from the version number of the root of the branch by appending −1 to the version number of the branch according to (branch_id).−1. For example, the first branch of version 1 off the first read-only snapshot copy of version 1 is assigned version number 1.1.−1.

The version set backup facility (48 in FIG. 1) initiates a version set backup in response to a backup request specifying a version set ID and version selection criterion. For example, the version selection criterion specifies a "full" backup of the version set. In this case, the version set backup facility invokes the snapshot copy facility (47 in FIG. 1) to create read-only snapshots for all writable versions in the version set, and then the version set backup facility combines all of the read-only snapshots of the version set together in a version set backup image written on tape.

In another example, the version selection criterion includes a list of version numbers of versions in the version set. For each version number for a writable version, the version set backup facility invokes the snapshot copy facility (47 in FIG. 1) to create a corresponding read-only snapshot in the version set, and substitutes the read-only snapshot number for the writable version number in the version selection criterion, and then the version set backup facility combines all of the read-only snapshots listed in the version selection criterion together in a version set backup image written on tape.

In another example, the version selection criterion specifies a condition of version attributes, and the version set backup facility searches the version set directory for versions that have attributes that satisfy the specified condition. The version set backup facility compiles a list of pointers to the versions that have attributes that satisfy the specified condition. If a writable version has attributes that satisfy the specified condition, then the version set backup facility invokes the snapshot copy facility to create a read-only snapshot copy of the writable version, and the version set backup facility substitutes a pointer to this read-only snapshot copy of the writable version. Then the version set backup facility combines all of the snapshots indicated in the list of pointers together in a version set backup image written on tape.

Figure 4:
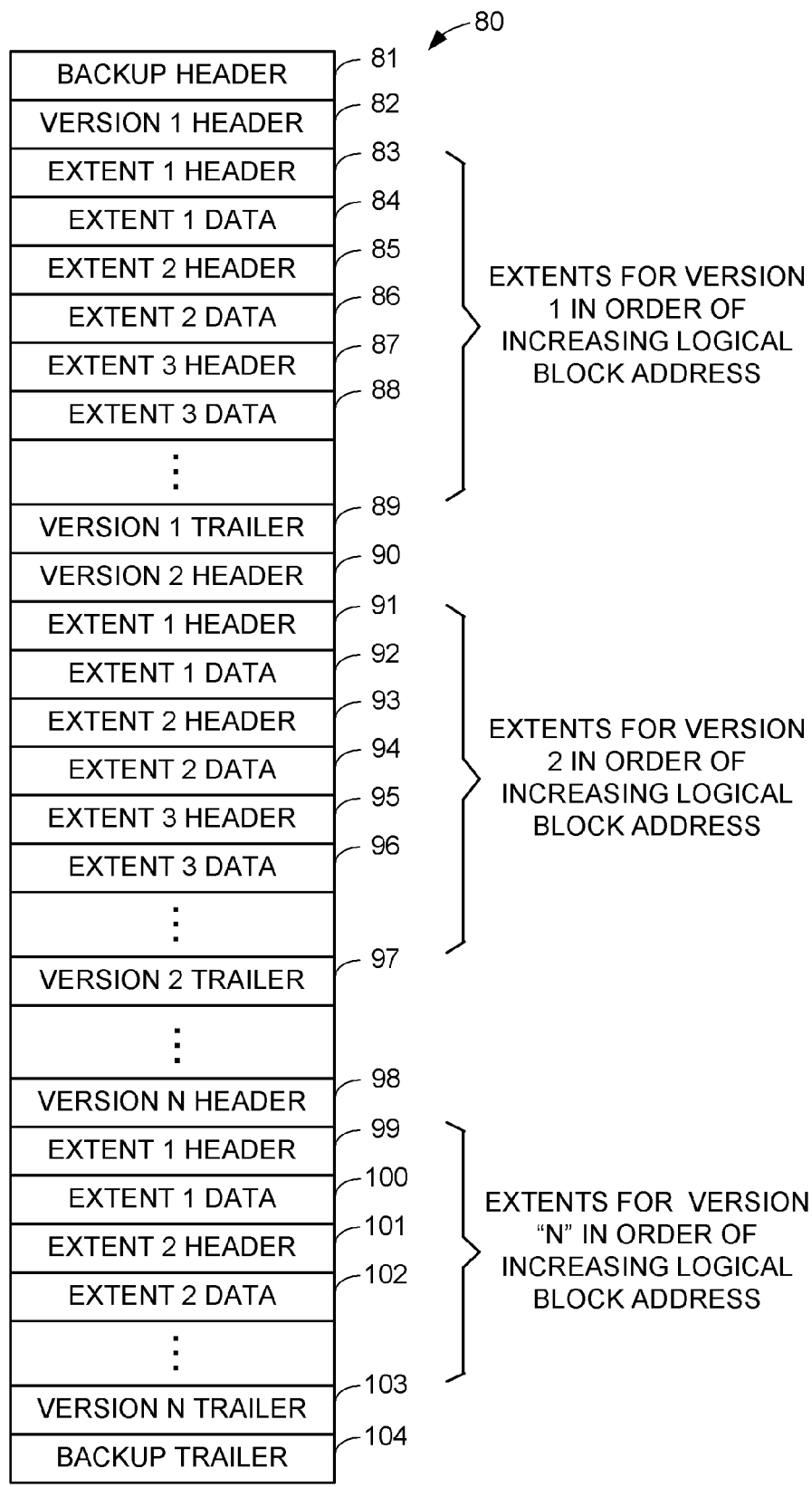
FIG. 4 is a block diagram of a version set stored on tape for backup of snapshot copies of a logical volume.

FIG. 4 shows a version set backup image on tape for backup of a logical volume. The top of FIG. 4 represents data at the beginning of the image which is written first to tape, and the bottom of FIG. 4 represents data at the end of the image which is written to tape last. In general, the specific information for multiple versions in the backup image is ordered by the respective creation times for the multiple versions, so that information specific to an earlier version occurs before information specific to a later version. However, a copy of some version attributes or information abstracted from a version may appear earlier toward the beginning of the image so that it can be read from tape more quickly.

Figure 5:
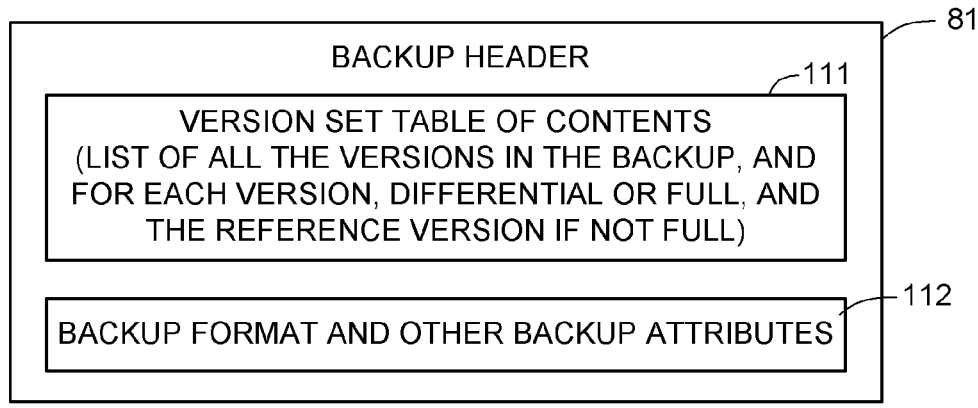
FIG. 5 is a block diagram of a backup header introduced in FIG. 4.

The version set backup image begins with a backup header 81. As further shown in FIG. 5, the backup header includes a version set table of contents 111. This version set table of contents 111 includes a list of all versions in the version set backup image, and for each version on the list, an indication of whether the version is either differential or full, and if the version is not full, a reference version for the differential version. (For a differential version, the differential version is fully restored from a copy of the reference version by writing the differential data of the differential version into the copy of the reference version.) The backup header 81 also includes a specification of the backup format and other attributes of the backup version set, such as the time that the version set backup image was created.

In a preferred implementation, any reference version for a version in the version set backup image is included in the version set backup image, so that any version in the backup image can be fully restored from the version set backup image. The reference version itself can be differential, so long as its reference can be fully restored from the backup image, so that the version set backup image format also supports incremental backups. In other words, an incremental version is a special kind of differential version; in particular, an incremental version is a differential version that has a reference version that is also a differential version. For restoration of a differential version from the backup image, this implies that at least one of the versions in the version set backup image is full. For example, in a conventional file level incremental backup procedure, a full backup is made of a file, followed by an incremental backup of the new data or changes made to the file each time that the file is opened, modified, and closed. Thus, the first version would be a full backup, and later versions would be incremental.

For backing up versions created by a snapshot copy facility, however, it may be more convenient for the last version to be a full version from the snapshot of the production version or the snapshot of a writable branch version, and for the earlier versions to be incremental. A conventional "copy on first write" snapshot copy facility automatically saves and identifies the data that is exclusively found in an earlier snapshot, so that there is no need for the version set backup facility to compare versions to produce the incremental data for earlier snapshots preceding a full version for the last snapshot of the production version or a writable branch version. Instead, the version set backup facility requests the incremental data from the snapshot copy facility.

Figure 6:
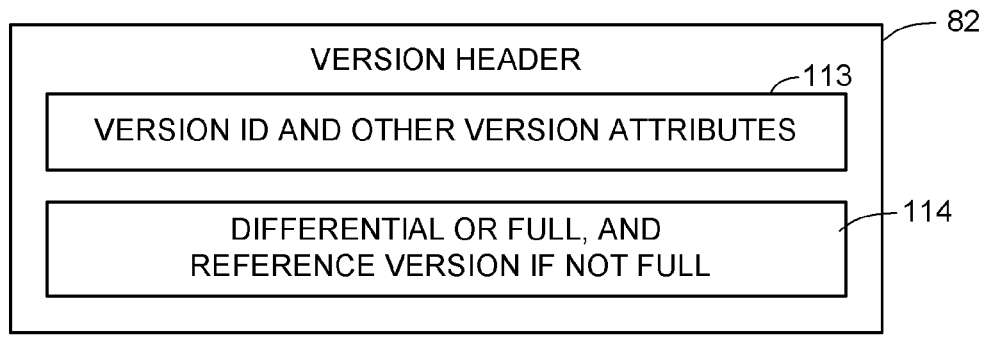
FIG. 6 is a block diagram of a version header introduced in FIG. 4.

As shown in FIG. 4, the backup header 81 is followed by a first version header 82. As further shown in FIG. 6, the version header 82 includes a version ID 113 and other version attributes, such as the time when the version was created. The version header also includes an indication 114 of whether the version is differential or full, and if the version is not full, the reference version for the differential version.

Figure 7:
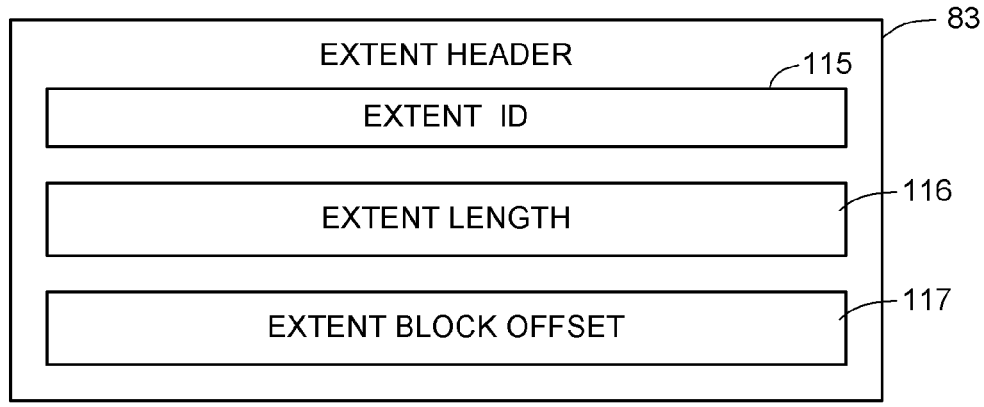
FIG. 7 is a block diagram of an extent header introduced in FIG. 4.

As shown in FIG. 4, the version header 82 is followed by a first extent header 83. An extent is a group of logical data blocks having contiguous logical block addresses in the storage array. As shown in FIG. 7, the extent header 83 includes an extent ID 115, an extent length 115, and an extent block offset 117. The extent length 115 specifies the number of logical data blocks in the extent. The extent block offset 117 specifies the logical block address of the first logical data block in the extent The extent ID permits extents to be shared for data compression. For example, an extent ID of zero represents a "hole" containing data having a value of zero. If the extent ID is not zero but the extent length is zero, then the extent ID indicates that the extent length and data for the extent is found somewhere else in association with the extent ID, such as in a previous extent in the version set backup image, or in a redundant data elimination store.

As shown in FIG. 4, the first extent header 83 is followed by data 84 for a first variable-length extent. The data 84 for the first extent is followed by a header 85 for a second variable-length extent, data 86 for the second extent, a header 87 for a third variable-length extent, and data 88 for the third extent. This is followed by remaining extent headers and extent data for the first version. The extent data for the first version is terminated by a trailer 89 for the first version. The trailer 89 is followed by a header 90 for a second version, a header 91 for a first variable-length extent of the second version, data 92 for the first extent, a header 93 for a second variable-length extent of the second version, data 94 for the second extent, a header 95 for a third variable-length extent of the second version, and data 96 for the third extent. The extent data for the second version is terminated by a trailer 97 for the second version.

The trailer 97 is followed by records for versions 3 to (N−1). The records for each version are similar to the records 82 to 89 for the first version, and records 90 to 97 for the second version. The records for the last version (N) begin with a version header 98 for the Nth version, data 100 for a first variable-length extent of the Nth version, a header 101 for a second variable-length extent of the Nth version, and data 102 for the second extent of the Nth version. The data for the Nth version is terminated with a trailer 103 for the Nth version.

Although the version set backup image format of FIG. 4 could be used for backup of versions of a logical volume containing a hierarchical file system, such a backup image does not facilitate a physical restore of just a specified file in the file system, because typically the metadata and data of a single file is disbursed throughout each version in the backup image. Instead, to restore a specified file in the file system, one would first restore a version of the file system, and then extract the file from the restored version of the file system. Although the conventional incremental backup of versions of a file permits a physical restore of the file from a backup image, the conventional incremental backup of versions of a file does not preserve the mapping of the file data and metadata to the logical blocks of the volume containing the file system including the file. Preservation of the mapping of the file data and metadata to the logical blocks of the volume may be useful for data compression and useful for recovery from data corruption.

Figure 8:
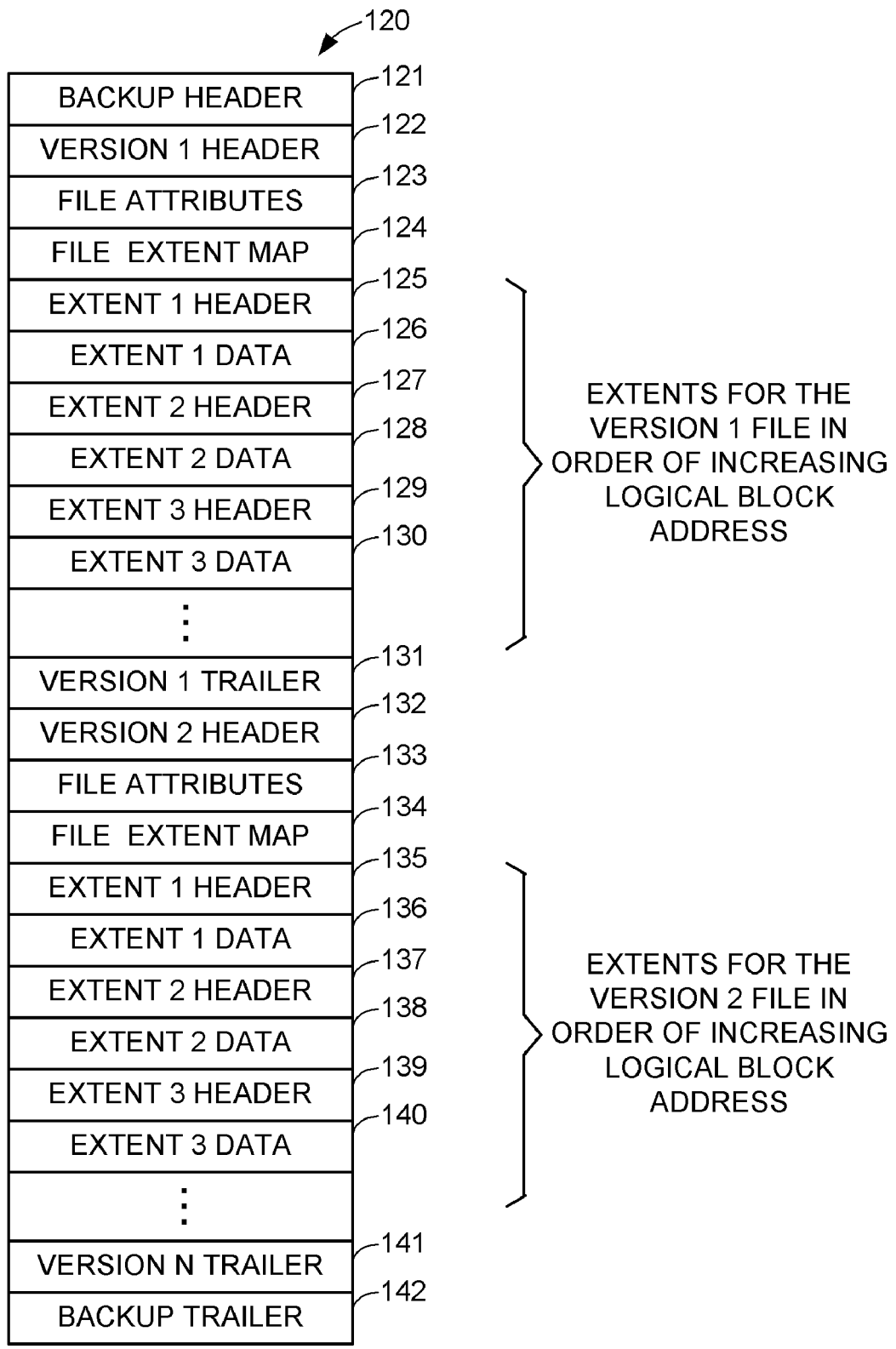
FIG. 8 is a block diagram of a version set stored on tape for backup of snapshot copies of a file while preserving a logical block mapping of the file.

FIG. 8 shows a version set backup image 120 for snapshot copies of a file in which the logical block mapping of the file is preserved and explicit in the backup image. The backup image 120 includes a backup header 121, a header 122 for a first version, file attributes 123 for the first version, a file extent map 124 for the first version, a header 125 for a first variable-length extent of the first version, data 126 for the first extent, a header 127 for a second variable-length extent of the first version, data 128 for the second extent, a header 129 for a third variable-length extent of the first version, and data 130 for the third extent. The data for the last variable-length extent of the first version is terminated by a trailer 131 for the first version.

The trailer 131 for the first version is followed by a header 132 for a second version, file attributes 133 for the second version, a file extent map 134 for the second version, a header 135 for a first variable-length extent of the second version, data 136 for the first extent, a header 137 for a second variable-length extent of the second version, data 138 for the second extent, a header 139 for a third variable-length extent of the second version, and data 140 for the third extent. The data for a last variable-length extent (N) of the second version is terminated by a trailer 141 for the last extent (N). The trailer 141 for the last extent (N) is terminated by a backup trailer 142 for the version set 120.

In the version set backup image 120, the file attributes 123 are copied from the inode of the file of the first version. The file extent map 124 is obtained by re-formatting file mapping metadata extracted from the inode and any indirect blocks of the file of the first version. The re-formatting of the file mapping metadata provides for more efficient storage of the file mapping metadata and file data because file data blocks that have contiguous logical block addresses in the storage array are consolidated into variable-length extents. The consolidation of the contiguous file data blocks into the variable-length extents also facilitates more efficient streaming of the file data to and from the storage array because the logical blocks in the variable-length extents are ordered by their logical storage addresses so that disk track seeking and thrashing is reduced. Thus, the variable-length extents are ordered by increasing logical block address, or the variable-length extents are ordered by decreasing logical block address. In addition, for each snapshot copy having incremental or differential extent data, the file mapping metadata stored for the snapshot copy also is incremental or differential. Thus, in the tape image 120, the file mapping metadata for a given snapshot need include only the file mapping metadata for the extent data of the given snapshot.

FIG. 9 shows an extent map 70 introduced in FIG. 8. The extent map 70 includes a list of variable-length extents, and specifies for each extent, a file offset, logical block address, length, and status. Each extent is a range of contiguous logical block addresses of file data. The length indicates the number of data blocks in the extent. The status, for example, specifies whether or not the extent is valid for reading and writing, valid for read only, invalid, or is a hole. The entries in the extent map are ordered by file offset, because the extent map is used for mapping a specified file offset to a corresponding logical block address. When written to tape, however, the extents of the file are ordered by logical block address.

For many applications, the status field is not needed. For example, for a logical volume such as an iSCSI LUN, the file server may simply keep track of which data blocks have been written to since allocation. In this case, all extents that have been written to are backed up and are presumed to be valid for reading or writing, so that the status field is not needed. The status field also is not needed to indicate the presence of a hole if the presence of a hole is encoded in the extent name.

For example, the logical data block size is the standard disk sector size of 512 bytes, and the minimum extent length is sixteen logical data blocks, for a total of 8 kilobytes, and the length of each extent is an integer multiple of 8 kilobytes. In this case, the amount of data in each extent is eight kilobytes times the number in the extent map length field for the extent.

Figure 10:
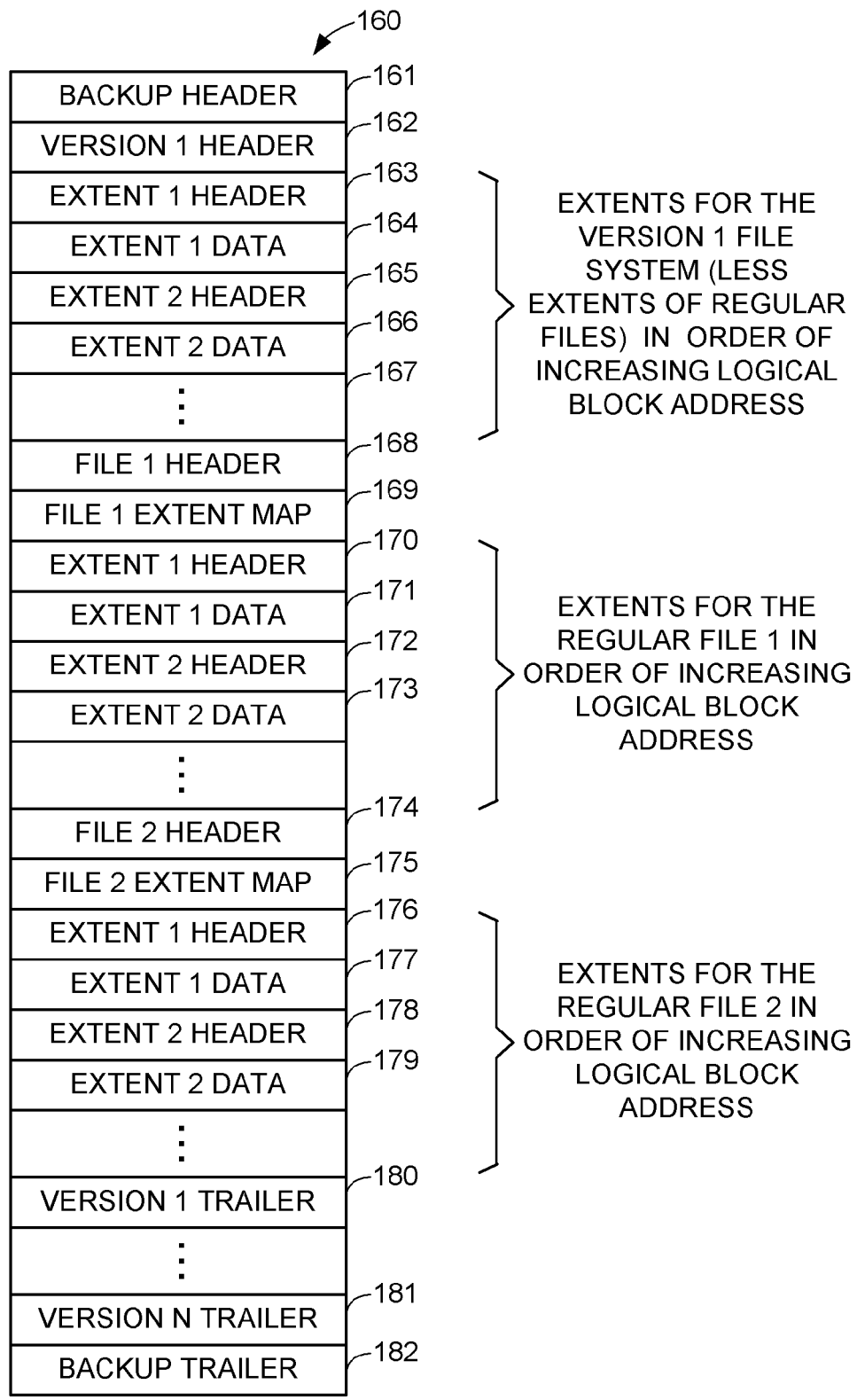
FIG. 10 is a block diagram of a version set stored on tape for backup of snapshot copies of a file system and permitting rapid recovery of a selected file in the file system.

FIG. 10 shows a version set tape image format 160 for facilitating physical restore of selected snapshot file copies from a file system. The format of FIG. 10 essentially results by extracting the file data from the file system, adding file version headers and file version extent maps to the basic tape image format of FIG. 4, and writing the extracted file data to the tape image following each file version header and file version extent map. Thus, the version set tape image 160 includes a backup header 161, a first version header 162, a header 163 for a first variable-length extent, first extent data 164, a header 165 for a second variable-length extent, and second extent data 165, similar to the backup header 81, first version header 82, first extent header 83, first extent data 84, second extent header 85, and second extent data 86, of the basic tape image format of FIG. 4. However, in the tape image 160 of FIG. 10, the first extent data 164 and the second extent data 166 do not include the data of any regular files in the first version of the file system.

Following the variable-length extents of logical blocks of the first version of the file system, excluding the logical blocks of data of regular files, is a first file header 168 including a copy of the file attributes of a first file in the first version of the file system. These file attributes are copied from the inode for the first file as found in the first version of the file system. Following the first file header 168 for the first version of the file system is an extent map 169 for the first file in the first version of the file system. This extent map provides a mapping of respective offsets in the first file in the first version to corresponding logical block addresses of variable-length extents of data in the first file in the first version. Following the extent map 169 is a first extent header 170, first extent data 171, a second extent header 172, and second extent data, etc., for each of the variable-length extents in the extent map 169.

Following the extent data for the first file of the first version of the file system is a file header 174 for a second file in the first version of the file system. Following the file header 174 for the second file is an extent map 175 for the second file in the first version of the file system. Following the extent map 175 for the second file is a first extent header 176, first extent data 177, a second extent header 178, and second extent data. Extent headers and extent data would follow for the remaining extents in the extent map 175. File headers, extent maps, and extent data would follow for the remaining files in the first version of the file system. A first version trailer 180 following the last extent of data for the last file in the first version of the file system. The first version trailer 180 is followed by a header for a second version of the file system, followed by extent headers and extent data for the second version of the file system, followed by file headers, extent maps, and extent data for the data of the regular files in the second version of the file system. The tape image 160 continues with records for additional versions up to an Nth version of the file system, ending with a trailer 181 for the Nth version of the file system. The tape image is terminated with a backup trailer 182 following the trailer 181 for the Nth version of the file system.

Figure 11:
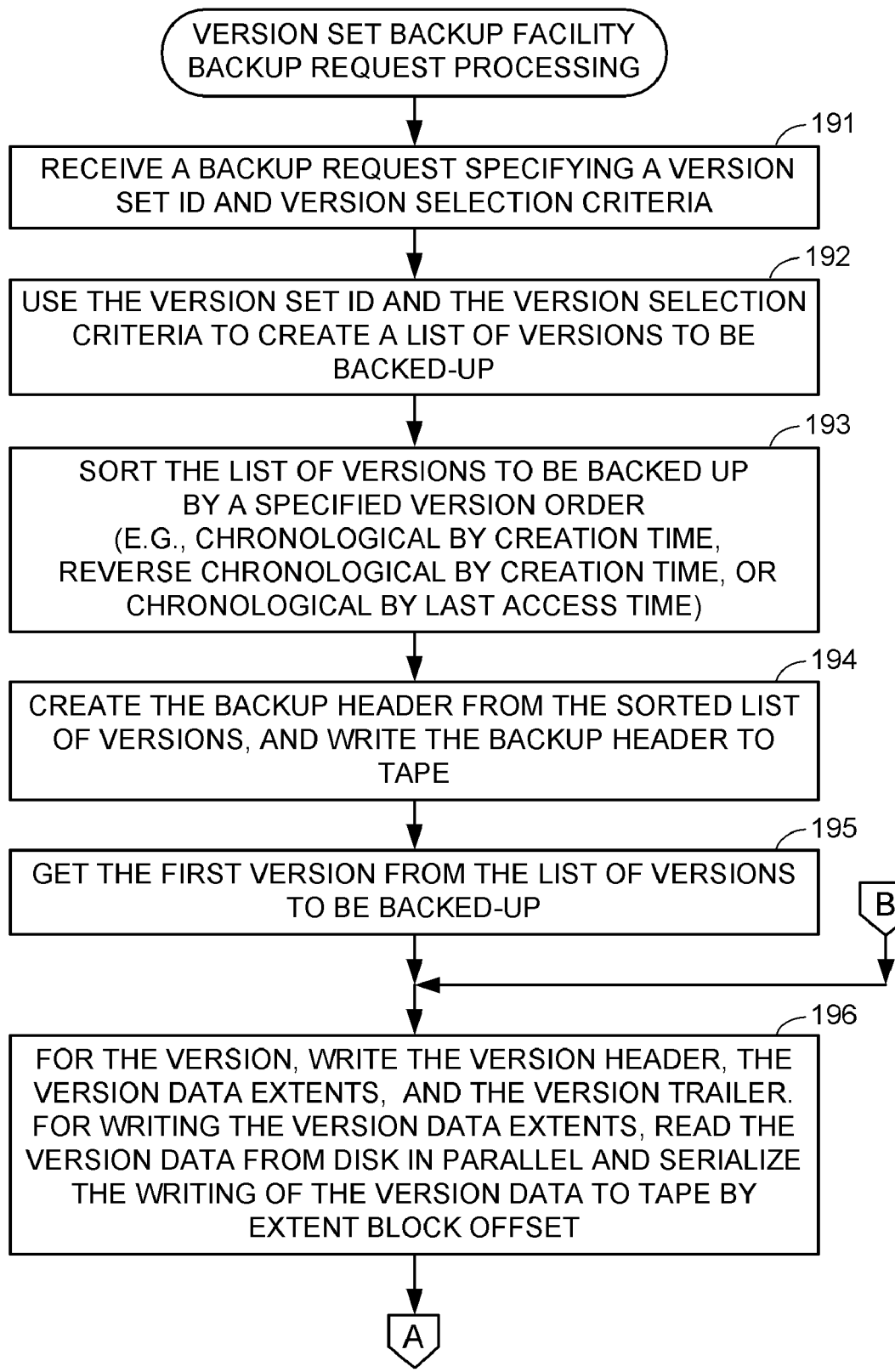
FIGS. 11 and 12 together comprise a flowchart of programming in the version set backup facility of FIG. 1 for processing a backup request.
Figure 12:
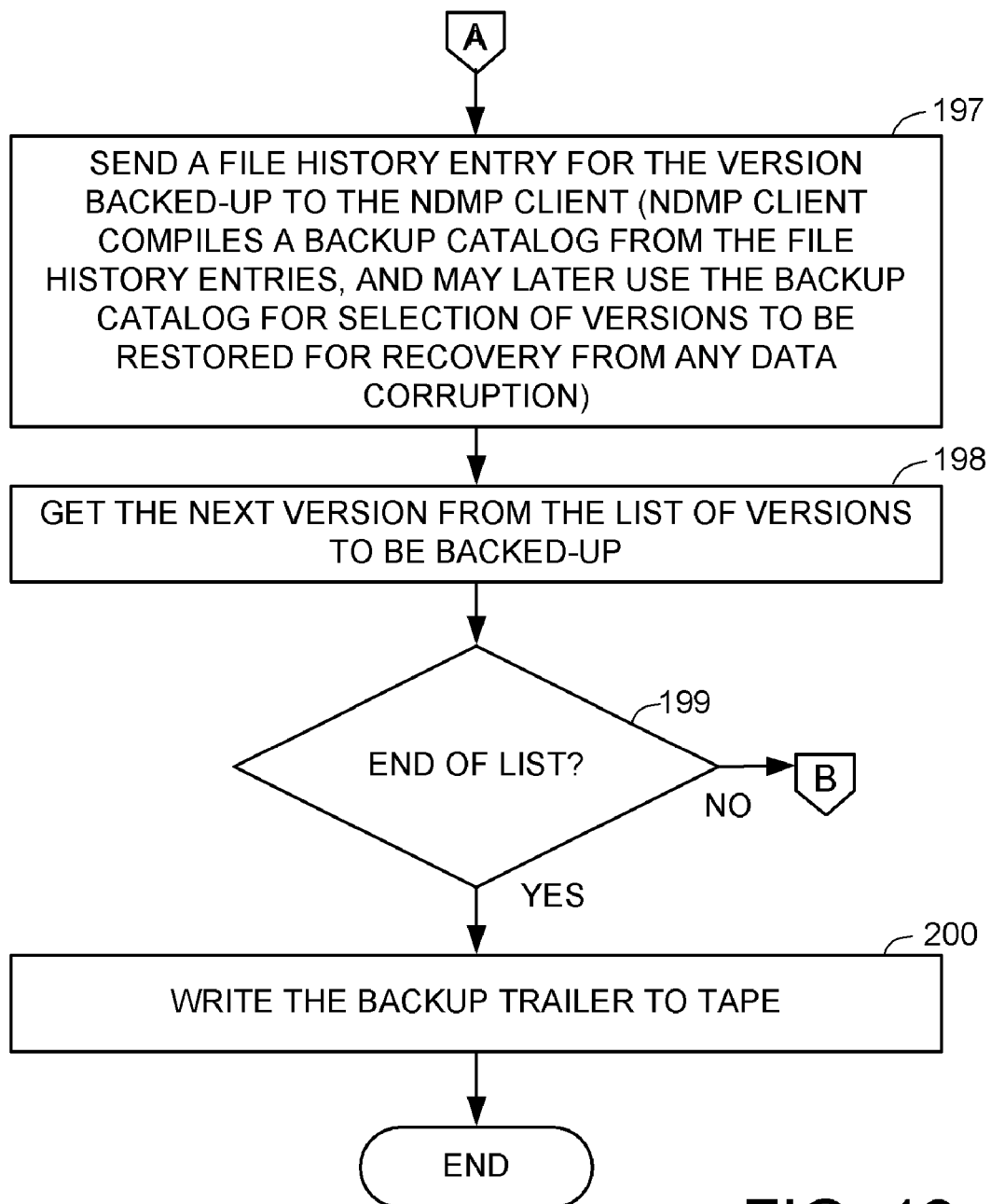

FIGS. 11 and 12 show programming in the version set backup facility (48 in FIG. 1) for processing of a backup request from the NDMP client (39 in FIG. 1). In a first step 191 of FIG. 11, the version set backup facility receives a backup request specifying a version set ID and version selection criteria. In step 192, the version set backup facility uses the version set ID and the version selection criteria to create a list of versions to be backed-up. In step 193, the version set backup facility sorts the list of versions to be backed up by a specified version order. The version order, for example, is either chronological by the creation time of each version, reverse chronological by the creation time of each version, or chronological by last access time of the version.

Typically the version order that is used will influence the restore characteristics without significantly impacting the backup time. Creation of synthetic backup images can also become a lot faster if the appropriate version order is used. For example, if the snapshot copy facility automatically maintains a full copy of the most recent snapshot and incremental data for earlier snapshot copies, then backup in a reverse chronological order with a first full version on tape and successive incremental versions on tape will not require production of synthetic versions on tape or during restoration and will enable faster restoration because the full copy of the most recent snapshot will be read first.

In most cases, a default version order can be set by an environment parameter depending on the usual method of version production, and this default version order can be overridden if desired by a specified version order in the backup request from the NDMP client. For example, there are two environment parameters for backup, "VERSION_ORDER" and "DIFF_TYPE." "VERSION_ORDER" is either "CHRONO," "RCHRONO," or "ACCESS" to select a default version order of either either chronological by the creation time of each version, reverse chronological by the creation time of each version, or chronological by last access time of the version, respectively. "DIFF_TYPE" is either "DIFFERENTIAL" or "INCREMENTAL". In any default case, the first version on the backup tape image is a full image, and the other versions on the backup tape image are either differential or incremental with respect to the first version and other versions in the on-tape order, as selected by the "DIFF_TYPE" parameter.

In step 194, the version set backup facility creates the backup header from the sorted list of versions, and writes the backup header to tape. In step 195, the version set backup facility gets the first version from the list of versions to be backed up. In step 196, for the version, the version set backup facility writes the version header, the version data extents, and the version trailer. For writing the version data extents, the version data is read from disk in parallel into the buffer memory, and the writing of the version data to tape from the buffer memory is serialized. In general, for each version, the writing of the version data to tape from the buffer memory is serialized by extent block offset. The format of FIG. 10 is a special case, in which the writing of all but the data of regular files for each version written first, serialized by extent block offset, and then the data of each regular file in the version is written, serialized for each file by extent block offset.

In step 197, the version set backup facility sends a file history entry for the version backed-up to the NDMP client (39 in FIG. 1). The file history entry contains attributes of the version as backed-up on tape. For example, the file history entry identifies whether or not the version is full, and if not, its reference version. The file history entry may include an on-tape offset of the version header. Typically, the NDMP client will compile a backup catalog from the file history entries, and may later use this backup catalog for selection of versions to be restored for recovery from any data corruption.

In step 198, the version set backup facility gets the next version from the list of version to be backed-up. In step 199, if the end of the list of versions to be backed-up has not been reached, execution loops back to step 196 of FIG. 11 in order to back up the next version on the list. In step 199, if the end of the list of versions to be backed-up has been reached, then execution continues from step 199 to step 200. In step 200, the version set backup facility writes the backup trailer to tape. Once step 200 is done, backup of the version set has been finished.

Figure 13:
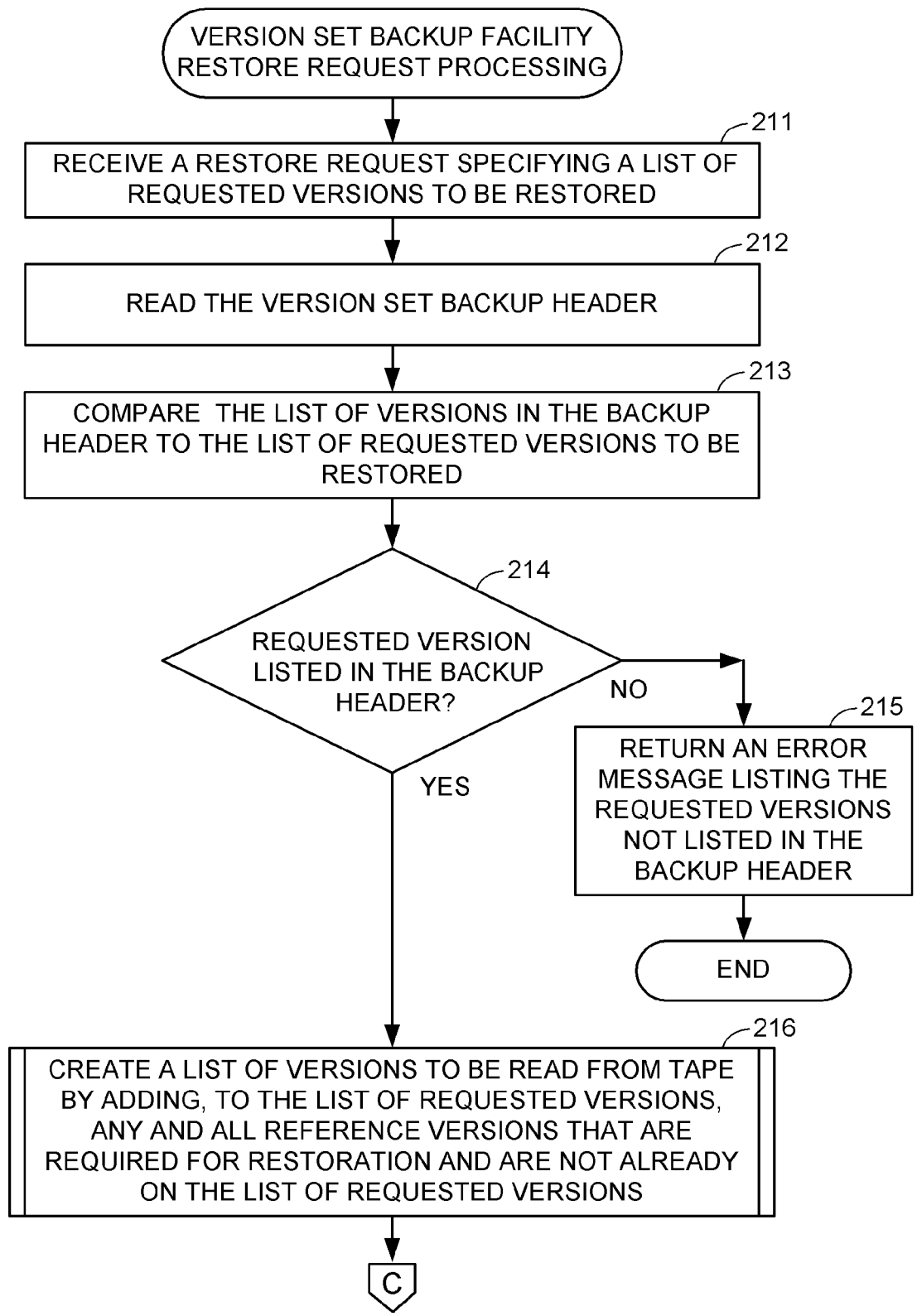
FIGS. 13 and 14 together comprise a flowchart of programming in the version set backup facility of FIG. 1 for processing a restore request.
Figure 14:
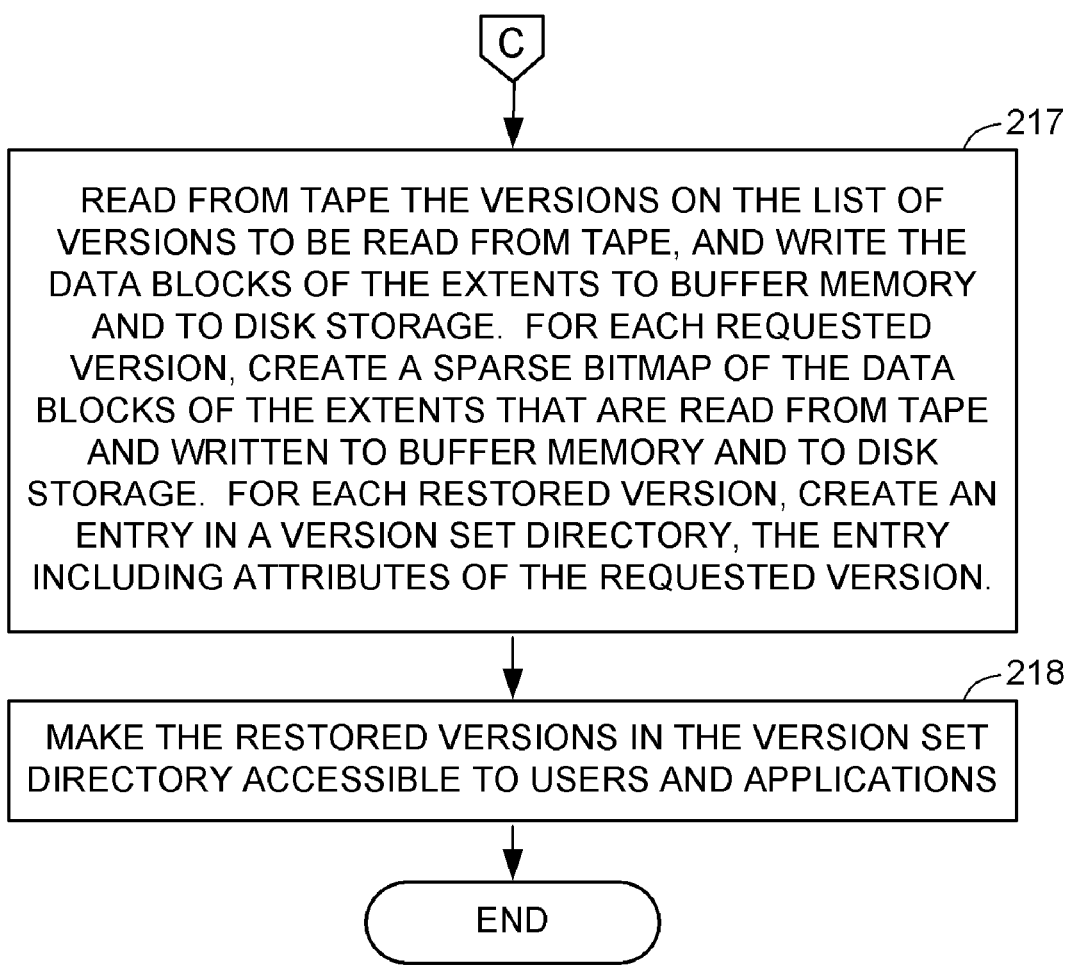

FIGS. 13 and 14 show programming in the version set backup facility of FIG. 1 for processing a restore request. In a first step 211, the version set backup facility receives a restore request specifying a list of requested versions to be restored. For example, the version set backup facility receives the restore request from the NDMP client (39 in FIG. 1), and the request specifies a version set ID and a list of version numbers including one or more or all of the version numbers of the versions in the version set. In step 212, the version set backup facility requests the tape library unit to read the version set backup header from the first tape cartridge containing the version set backup image, and receives the version set backup header from the tape library unit.

In step 213, the version set backup facility compares the list of versions in the backup header to the list of requested versions to be restored. In step 214, if a requested version to be restored is not listed in the backup header, then execution branches to step 215. In step 215, the version set backup facility returns, to the NDMP client, an error message listing the requested versions not listed in the backup header, and processing of the restore request is finished.

In step 214, if all of the requested versions are listed in the backup header, then execution continues to step 216. In step 216, the version set backup facility creates a list of versions to be read from tape by adding, to the list of requested version, any and all reference versions that are required for restoration and are not already on the list of requested versions. For example, step 216 is performed by calling a subroutine, which is further described below with reference to FIG. 15. Execution continues from step 216 to step 217 of FIG. 14.

In step 217 of FIG. 14, the version set backup facility request the tape library unit to read from tape the versions on the list of versions to be read from tape. The file server receives these versions from the tape library unit and writes them to the buffer memory. The version set backup facility writes the data blocks of the extents from the buffer memory to disk storage in the storage array. In a preferred implementation, for each requested version, the version set backup facility creates a sparse bitmap of the data blocks of the extents that are read from tape and written to buffer memory and to disk storage. This sparse bitmap, for example, is used by the snapshot copy facility to avoid saving invalid data from previously unused data blocks of a volume when new data is written to these data blocks. For each restored version, the version set backup facility crease a corresponding entry in a version set directory. The corresponding entry includes attributes of the requested version. Finally, in step 218, the version set backup facility makes the restored versions in the version set directory accessible to users and applications.

Figure 15:
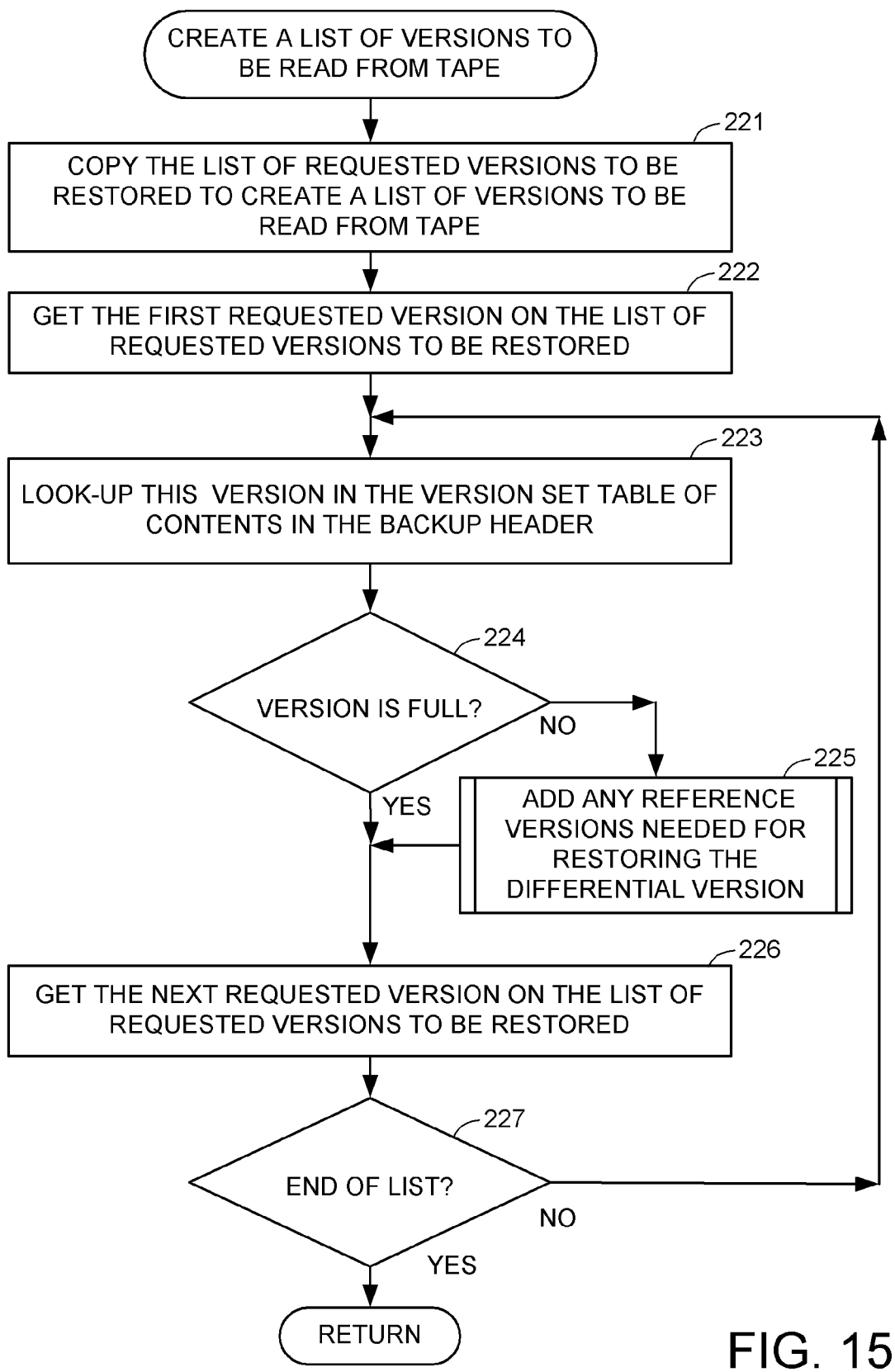
FIG. 15 is a flowchart of a subroutine introduced in FIG. 13 for creating a list of versions to be read from tape.

FIG. 15 shows the subroutine introduced in FIG. 13 for creating a list of versions to be read from tape. This subroutine adds any reference versions that are also needed for restoring the requested versions. In a first step 221, the list of requested versions to be restored is copied to create a list of versions to be read from tape. In step 222, the first requested version is obtained from the list of requested versions to be restored. In step 223, the version set table of contents in the backup header is accessed to look up the version obtained from the list of versions to be restored. If the version set table of contents indicates that the version obtained from the list of versions to be restored is not a full version, then execution branches to step 225 to call a subroutine, as further described below with reference to FIG. 16, for adding, to the list of versions to be read from tape, any reference versions that are also needed for restoring the differential version.

Execution continues from step 225 to step 226. Execution also continues from step 224 to step 226 if the version set table of contents indicates that the version obtained from the list of versions to be restored is a full version. In step 226, the next requested version is obtained from the list of requested versions to be restored. In step 227, if the end of the list of requested versions to be restored has not been reached, then execution loops back to step 223. Otherwise, if the end of the list has been reached, then execution returns.

Figure 16:
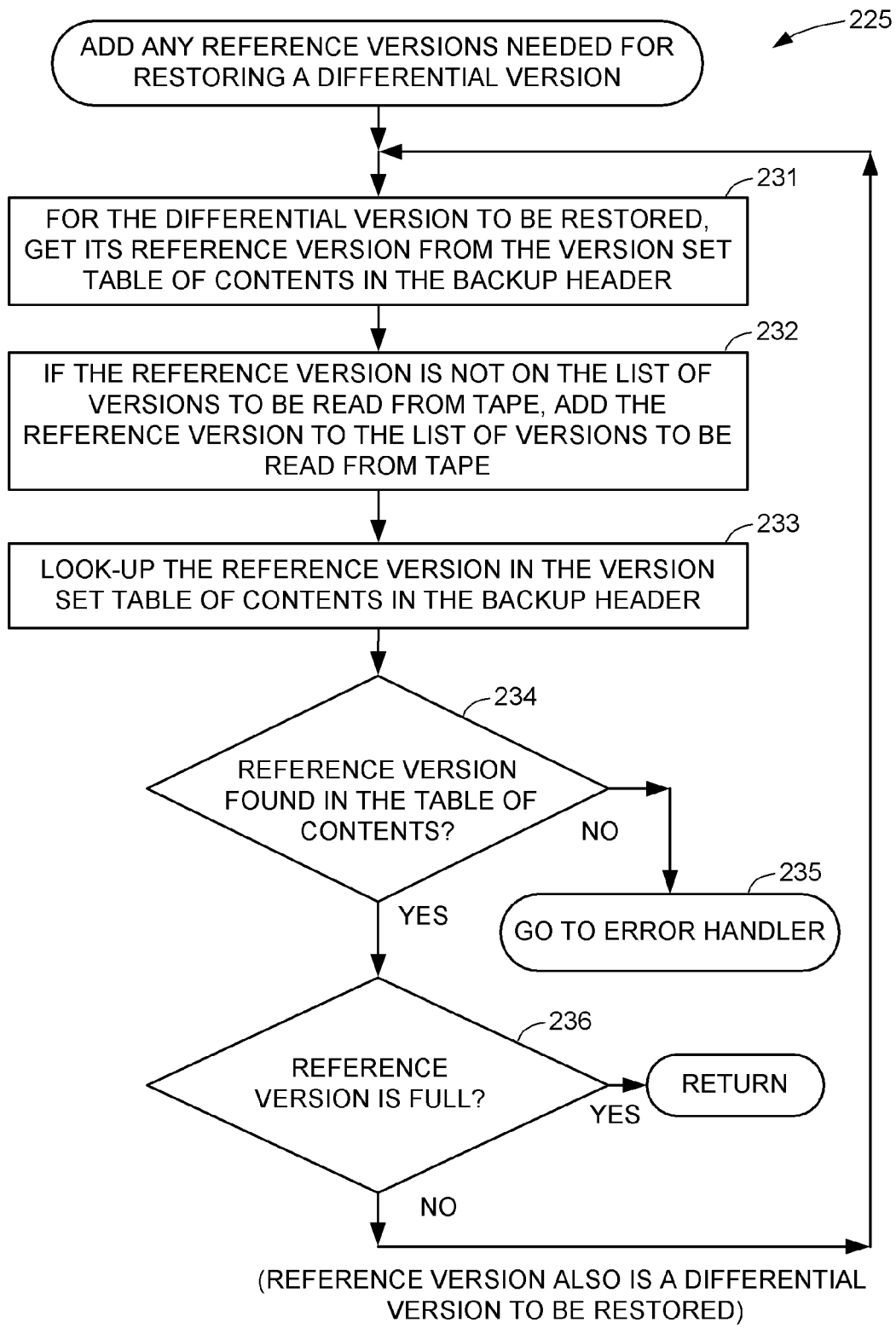
FIG. 16 is a flowchart of a subroutine introduced in FIG. 15 for adding, to the list of versions to be read from tape, any reference versions also needed for restoring a requested differential version.

FIG. 16 shows the subroutine introduced in step 225 of FIG. 15 for adding, to the list of versions to be read from tape, any reference versions also needed for restoring a requested differential version. In a first step 231 of FIG. 16, for the differential version to be restored, the reference version of the differential version is obtained from the version set table of contents in the backup header. Next, in step 232, if the reference version is not on the list of versions to be read from tape, the reference version is added to the list of versions to be read from tape. In step 233, the reference version is looked up in the version set table of contents in the backup header.

In step 234, if the reference version is not found in the version set table of contents, then execution branches to an error handler in step 235. In this case, it is likely that the version set has been corrupted, because each version set image on tape should include all of the reference versions needed for restoring all of the versions in the version set image on tape. In step 234, if the reference version is found in the version set table of contents, then execution continues from step 234 to step 236. In step 236, if the reference version is full, then execution returns. Otherwise, if the reference version is not full, execution loops from step 236 back to step 231.

In view of the above, there has been described a version set backup and restore facility and format that is independent of the facility or mechanism that creates the snapshot copies in the version set. The version set backup and restore facility abstracts out certain details of the logical data structures in the version set so that the version set backup and restore facility and format can be used for backup of different kinds of storage objects and is extensible to new storage objects. The version set backup and restore facility responds to a version set backup request by backing up multiple snapshot copies of a storage object concurrently from a storage array to backup storage media. The version set backup and restore facility responds to a version set restore request by restoring a plurality of snapshot copies of the storage object concurrently from the backup storage media to the storage array. The on-tape backup image of the version set includes variable-length extents of data for each of the multiple snapshot copies of the storage object. The variable-length extents of data for each of the snapshot copies of the storage object are grouped together and ordered in the on-tape backup image by increasing or decreasing logical block address. For physical restore of a selected version of a regular file, the on-tape backup image of the version set may include an extent map for each snapshot copy of the regular file. The extent map for a snapshot copy of a file maps offsets in the file to logical block addresses of variable-length extents of data in the file.

What is claimed is:

1. A computer-implemented method of operating at least one data processor in a data processing system, said method comprising:
(a) said at least one data processor receiving a version set backup request for backup of multiple snapshot copies of a storage object, the multiple snapshot copies having been created at respective spaced points in time, and said at least one data processor responding to the version set backup request by backing up the multiple snapshot copies of the storage object concurrently from a storage array to backup storage media; and then
(b) said at least one data processor receiving a version set restore request for restoration of a plurality of snapshot copies of the storage object, and said at least one data processor responding to the version set restore request by restoring the plurality of snapshot copies of the storage object concurrently from the backup storage media to the storage array;
wherein the backup storage media is a data storage tape, and the method further includes backing up the multiple snapshot copies of the storage object concurrently from the storage array to the tape by sequentially writing variable-length extents of data of the multiple snapshot copies of the storage object to the tape to create a backup image on the tape, wherein the variable-length extents of data for each of the snapshot copies of the storage object are grouped together and ordered sequentially in the backup image by increasing or decreasing logical block address.

2. The computer-implemented method as claimed in claim 1, wherein the method further includes writing a backup header to the tape at a beginning of the backup image, and then writing a respective group of records for each of the multiple snapshot copies of the storage object after the backup header, and then writing a backup trailer at an end of the backup image, and the respective group of records for each of the multiple snapshot copies of the storage object includes a version header and a version trailer, and the variable-length extents of data for each of the multiple snapshot copies of the storage object are grouped together between the version header for said each of the multiple snapshot copies of the storage object and the version trailer for said each of the multiple snapshot copies of the storage object.

3. The computer-implemented method as claimed in claim 1, wherein the storage object is a file, and the method further includes writing a respective extent map for each of the multiple snapshot copies of the file to the tape so that the backup image on the tape includes the respective extent map for each of the multiple snapshot copies of the file, wherein the extent map for each of the multiple snapshot copies of the file provides a mapping of respective file offsets to corresponding logical block addresses of variable-length extents of data in each of the multiple snapshot copies of the file.

4. A computer-implemented method of operating at least one data processor in a data processing system, said method comprising:
(a) said at least one data processor receiving a version set backup request for backup of multiple snapshot copies of a storage object, the multiple snapshot copies having been created at respective spaced points in time, and said at least one data processor responding to the version set backup request by backing up the multiple snapshot copies of the storage object concurrently from a storage array to backup storage media; and then
(b) said at least one data processor receiving a version set restore request for restoration of a plurality of snapshot copies of the storage object, and said at least one data processor responding to the version set restore request by restoring the plurality of snapshot copies of the storage object concurrently from the backup storage media to the storage array;
wherein the backup storage media is a data storage tape, and the method further includes backing up the multiple snapshot copies of the version set concurrently from the storage array to the tape by sequentially writing data of the multiple snapshot copies of the storage object to the tape to create a backup image on the tape, wherein the method includes writing a backup header to a beginning of the backup image on the tape, and the backup header includes a version set table of contents listing all of the multiple snapshot copies of the storage object, and indicates whether or not each of the multiple snapshot copies of the storage object is differential or full, and for at least one of the multiple snapshot copies of the storage object that is not full, the version set table of contents also indicates a reference version for said at least one of the multiple snapshot copies of the storage object that is not full.

5. The computer-implemented method as claimed in claim 4, wherein the version set restore request specifies requested versions to be restored, and the method further includes said at least one data processor responding to the version set restore request by accessing the version set table of contents to verify that the backup image on the tape includes all of the requested versions to be restored and to restore at least one additional reference version that is required for restoration of all of the requested versions to be restored.

6. A computer-implemented method of operating at least one data processor in a data processing system, said method comprising:
   (a) said at least one data processor receiving a version set backup request for backup of multiple snapshot copies of a storage object, the multiple snapshot copies having been created at respective spaced points in time, and said at least one data processor responding to the version set backup request by backing up the multiple snapshot copies of the storage object concurrently from a storage array to backup storage media; and then
   (b) said at least one data processor receiving a version set restore request for restoration of a plurality of snapshot copies of the storage object, and said at least one data processor responding to the version set restore request by restoring the plurality of snapshot copies of the storage object concurrently from the backup storage media to the storage array;
   wherein said at least one data processor receives the version set backup request from a data management application, and the method further includes said at least one data processor returning to the data management application a respective file history entry for each of the multiple snapshot copies that has been backed up to the backup storage media.

7. A data processing system comprising:
   client computers;
   a storage array for storing data at logical block addresses of storage in the storage array;
   a file server coupled to the client computers in a data network and coupled to the storage array for providing the client computers with access to storage objects stored in the storage of the storage array; and
   a tape library unit coupled to the file server for backup of data written to tape in the tape library unit, and for restoration of data read from the tape in the tape library unit;
   wherein the file server includes at least one data processor programmed with a snapshot copy facility for producing snapshot copies of the storage objects stored in the storage of the storage array;
   wherein said at least one data processor is further programmed with a version set backup facility, and the version set backup facility is programmed for receiving a version set backup request from one of the client computers for backup of multiple snapshot copies of a specified storage object, and for responding to the version set backup request by backing up the multiple snapshot copies of the specified storage object concurrently from the storage of the storage array to the tape in the tape library unit, and the version set backup facility is further programmed for receiving a version set restore request from said one of said client computers for restoration of a plurality of snapshot copies of the specified storage object, and for responding to the version set restore request by restoring the plurality of snapshot copies of the specified storage object concurrently from the tape in the tape library unit to the storage in the storage array; and
   wherein the version set backup facility is programmed for backing up the multiple snapshot copies of the specified storage object concurrently from the storage array to the tape in the tape library unit by sequentially writing variable-length extents of data of the multiple snapshot copies of the specified storage object to the tape in the tape library unit to create a backup image on the tape in the tape library unit, and the variable-length extents of data for each of the snapshot copies of the storage object are grouped together and ordered in the backup image by increasing or decreasing logical block address.

8. The data processing system as claimed in claim 7, wherein the version set backup facility is further programmed for writing a backup header to the tape in the tape library unit at a beginning of the backup image, and then writing a respective group of records in the backup image for each of the multiple snapshot copies of the storage object after the backup header, and then writing a backup trailer at an end of the backup image, and the respective group of records for each of the multiple snapshot copies of the specified storage object includes a version header and a version trailer, and the variable-length extents of data for each of the multiple snapshot copies of the specified storage object are grouped together between the version header for said each of the multiple snapshot copies of the specified storage object and the version trailer for said each of the multiple snapshot copies of the specified storage object.

9. A data processing system comprising:
   client computers;
   a storage array for storing data at logical block addresses of storage in the storage array;
   a file server coupled to the client computers in a data network and coupled to the storage array for providing the client computers with access to storage objects stored in the storage of the storage array; and
   a tape library unit coupled to the file server for backup of data written to tape in the tape library unit, and for restoration of data read from the tape in the tape library unit;
   wherein the file server includes at least one data processor programmed with a snapshot copy facility for producing snapshot copies of the storage objects stored in the storage of the storage array;
   wherein said at least one data processor is further programmed with a version set backup facility, and the version set backup facility is programmed for receiving a version set backup request from one of the client computers for backup of multiple snapshot copies of a specified storage object, and for responding to the version set backup request by backing up the multiple snapshot copies of the specified storage object concurrently from the storage of the storage array to the tape in the tape library unit, and the version set backup facility is further programmed for receiving a version set restore request from said one of said client computers for restoration of a plurality of snapshot copies of the specified storage object, and for responding to the version set restore request by restoring the plurality of snapshot copies of the specified storage object concurrently from the tape in the tape library unit to the storage in the storage array; and
   wherein the specified storage object is a file, and the version set backup facility is further programmed for writing a respective extent map for each of the multiple snapshot copies of the file to the tape in the tape library unit so that the backup image includes the respective extent map for each of the multiple snapshot copies of the file, wherein the extent map for each of the multiple snapshot copies of the file provides a mapping of respective file offsets to corresponding logical block addresses of variable-length extents of data in each of the multiple snapshot copies of the file.

10. A data processing system comprising:

client computers;

a storage array for storing data at logical block addresses of storage in the storage array;

a file server coupled to the client computers in a data network and coupled to the storage array for providing the client computers with access to storage objects stored in the storage of the storage array; and a tape library unit coupled to the file server for backup of data written to tape in the tape library unit, and for restoration of data read from the tape in the tape library unit;

wherein the file server includes at least one data processor programmed with a snapshot copy facility for producing snapshot copies of the storage objects stored in the storage of the storage array;

wherein said at least one data processor is further programmed with a version set backup facility, and the version set backup facility is programmed for receiving a version set backup request from one of the client computers for backup of multiple snapshot copies of a specified storage object, and for responding to the version set backup request by backing up the multiple snapshot copies of the specified storage object concurrently from the storage of the storage array to the tape in the tape library unit, and the version set backup facility is further programmed for receiving a version set restore request from said one of said client computers for restoration of a plurality of snapshot copies of the specified storage object, and for responding to the version set restore request by restoring the plurality of snapshot copies of the specified storage object concurrently from the tape in the tape library unit to the storage in the storage array; and wherein the version set backup facility is further programmed for writing a backup header to a beginning of the backup image on the tape, and the backup header includes a version set table of contents listing all of the multiple snapshot copies of the storage object, and indicates whether or not each of the multiple snapshot copies of the storage object is differential or full, and for at least one of the multiple snapshot copies of the storage object that is not full, also indicates a reference version for said at least one of the multiple snapshot copies of the storage object that is not full.

11. The data processing system as claimed in claim 10, wherein the version set restore request specifies requested versions to be restored, and the version set backup facility is further programmed for responding to the version set restore request by accessing the version set table of contents to verify that the backup image on the tape includes all of the requested versions to be restored and for restoring at least one additional reference version that is required for restoration of all of the requested versions to be restored.

12. A data processing system comprising:

client computers;

a storage array for storing data at logical block addresses of storage in the storage array;

a file server coupled to the client computers in a data network and coupled to the storage array for providing the client computers with access to storage objects stored in the storage of the storage array; and a tape library unit coupled to the file server for backup of data written to tape in the tape library unit, and for restoration of data read from the tape in the tape library unit;

wherein the file server includes at least one data processor programmed with a snapshot copy facility for producing snapshot copies of the storage objects stored in the storage of the storage array;

wherein said at least one data processor is further programmed with a version set backup facility, and the version set backup facility is programmed for receiving a version set backup request from one of the client computers for backup of multiple snapshot copies of a specified storage object, and for responding to the version set backup request by backing up the multiple snapshot copies of the specified storage object concurrently from the storage of the storage array to the tape in the tape library unit, and the version set backup facility is further programmed for receiving a version set restore request from said one of said client computers for restoration of a plurality of snapshot copies of the specified storage object, and for responding to the version set restore request by restoring the plurality of snapshot copies of the specified storage object concurrently from the tape in the tape library unit to the storage in the storage array; and wherein the version set backup facility is further programmed for grouping the data of each of the multiple snapshot copies of the specified storage object together in the backup image on the tape in a specified version order, and the version set backup facility is further programmed for responding to a specification of a chronological version order by version creation time for the backup request by grouping data of the multiple versions in the backup image on the tape in a chronological order by creation time of the multiple versions in the backup image, responding to a specification of a reverse chronological order by creation time for the backup request by grouping data of the multiple versions in the backup image on the tape in reverse chronological order by creation time of the multiple versions in the backup image, and responding to a specification of a chronological order by last access time for the version set backup request by grouping data of multiple versions in the backup image on the tape in chronological order by last access time of the multiple versions in the backup image.

13. A data processing system comprising:

client computers;

a storage array for storing data at logical block addresses of storage in the storage array;

a file server coupled to the client computers in a data network and coupled to the storage array for providing the client computers with access to storage objects stored in the storage of the storage array; and a tape library unit coupled to the file server for backup of data written to tape in the tape library unit, and for restoration of data read from the tape in the tape library unit;

wherein the file server includes at least one data processor programmed with a snapshot copy facility for producing snapshot copies of the storage objects stored in the storage of the storage array;

wherein said at least one data processor is further programmed with a version set backup facility, and the version set backup facility is programmed for receiving a version set backup request from one of the client computers for backup of multiple snapshot copies of a specified storage object, and for responding to the version set backup request by backing up the multiple snapshot copies of the specified storage object concurrently from the storage of the storage array to the tape in the tape library unit, and the version set backup facility is further programmed for receiving a version set restore request from said one of said client computers for restoration of a plurality of snapshot copies of the specified storage object, and for responding to the version set restore request by restoring the plurality of snapshot copies of the specified storage object concurrently from the tape in the tape library unit to the storage in the storage array; and wherein the version set backup facility is further programmed for returning to said one of the client computers a respective file history entry for each of the multiple snapshot copies that is backed up to the tape in the tape library unit.

14. A data storage tape mountable to a tape drive for writing data to the tape and for reading data from the tape, wherein the tape contains a series of data records comprising an image of a version set, the version set includes a series of snapshot copies of a storage object taken at respective spaced points in time, and the tape image includes variable-length extents of data for each of the snapshot copies of the storage object, and the variable-length extents of data for each of the snapshot copies of the storage object are grouped together and ordered in the image by increasing or decreasing logical block address.

15. The data storage tape as claimed in claim 14, wherein the image of the version set begins with a backup header and ends with a backup trailer, and the image of the version set includes a respective group of sequential records for each of the multiple snapshot copies of the storage object between the backup header and the backup trailer, and the respective group of records for each of the multiple snapshot copies of the specified storage object begins with a version header and ends with a version trailer, and the variable-length extents of data for each of the multiple snapshot copies of the specified storage object are grouped together between the version header for said each of the multiple snapshot copies of the storage object and the version trailer for said each of the multiple snapshot copies of the storage object.

16. The data storage tape as claimed in claim 15, wherein the backup header includes a version set table of contents listing all of the multiple snapshot copies of the storage object in the image of the version set, and the version set table of contents indicates whether or not each of the multiple snapshot copies of the storage object as stored on the tape is differential or full, and for at least one of the multiple snapshot copies of the storage object that is not full, also the version set table of contents also indicates a reference version for said at least one of the multiple snapshot copies of the storage object that is not full as stored on the tape.

17. The data storage tape as claimed in claim 14, wherein each of the snapshot copies of the specified storage object includes at least one file, and for each of the files, the backup image includes a respective extent map including a mapping of respective file offsets to corresponding logical block addresses of variable-length extents of data in each of the multiple snapshot copies of the file.

18. The data storage tape as claimed in claim 14, wherein the storage object is a file system, the variable-length extents of data for each of a plurality of regular files in each of the multiple snapshot copies of the file system are grouped together in the image and are ordered by increasing or decreasing logical block address, and additional variable-length extents in each of the multiple snapshot copies of the file system that are not extents of data of regular files in each of the multiple snapshot copies of the file system are also grouped together in the image and ordered in the image by increasing or decreasing logical block address, and the image further includes a respective extent map for each of the files in each of the multiple snapshot copies of the file system, wherein the extent map for each of the files in each of the multiple snapshot copies of the file system includes a mapping of respective file offsets to corresponding logical block addresses of variable-length extents of data in each of the files in each of the multiple snapshot copies of the file system.

* * * * *